(12) United States Patent
Duthaler et al.

(10) Patent No.: US 6,865,010 B2
(45) Date of Patent: Mar. 8, 2005

(54) ELECTROPHORETIC ELECTRONIC DISPLAYS WITH LOW-INDEX FILMS

(75) Inventors: Gregg Duthaler, Needham, MA (US); Anthony Pullen, Belmont, MA (US)

(73) Assignee: E Ink Corporation, Cambridge, MA (US)

( * ) Notice: Subject to any disclaimer, the term of this patent is extended or adjusted under 35 U.S.C. 154(b) by 0 days.

(21) Appl. No.: 10/319,455

(22) Filed: Dec. 13, 2002

(65) Prior Publication Data

US 2003/0214697 A1 Nov. 20, 2003

Related U.S. Application Data

(60) Provisional application No. 60/341,183, filed on Dec. 13, 2001.

(51) Int. Cl.[7] .............................................. G02B 26/00
(52) U.S. Cl. ...................................................... 359/296
(58) Field of Search .................................. 359/296, 245; 345/107, 105; 204/600, 450; 430/32, 34, 38

(56) References Cited

U.S. PATENT DOCUMENTS

| | | | |
|---|---|---|---|
| 2,800,457 A | 7/1957 | Green et al. | |
| 3,036,388 A | 5/1962 | Tate | |
| 3,384,488 A | 5/1968 | Tulagin et al. | |
| 3,406,363 A | 10/1968 | Tate | |
| 3,460,248 A | 8/1969 | Tate | |
| 3,585,381 A | 6/1971 | Hodson et al. | |
| 3,612,758 A | 10/1971 | Evans et al. | |
| 3,668,106 A | 6/1972 | Ota | |
| 3,670,323 A | 6/1972 | Sobel et al. | |
| 3,756,693 A | 9/1973 | Ota | |
| 3,767,392 A | 10/1973 | Ota | |
| 3,772,013 A | 11/1973 | Wells | |
| 3,792,308 A | 2/1974 | Ota | |
| 3,806,893 A | 4/1974 | Ohnishi et al. | |
| 3,850,627 A | 11/1974 | Wells et al. | |
| 3,870,517 A | 3/1975 | Ota et al. | |
| 3,892,568 A | 7/1975 | Ota | |
| 3,909,116 A | 9/1975 | Kohashi | |
| 3,922,255 A | 11/1975 | Koestler et al. | |
| 4,001,140 A | 1/1977 | Foris et al. | |
| 4,041,481 A | 8/1977 | Sato | |
| 4,045,327 A | 8/1977 | Noma et al. | |

(List continued on next page.)

FOREIGN PATENT DOCUMENTS

| | | |
|---|---|---|
| EP | 0 186 710 A1 | 7/1986 |
| EP | 0 323 656 B1 | 7/1987 |
| EP | 0 240 063 B1 | 10/1987 |

(List continued on next page.)

OTHER PUBLICATIONS

Gutcho, "Capsule Wall Treatment," *Microcapsules and Microencapsulation Techniques*, 1976, pp. 156–177.

(List continued on next page.)

*Primary Examiner*—Hung Xuan Dang
*Assistant Examiner*—Tuyen Tra
(74) *Attorney, Agent, or Firm*—Testa, Hurwitz & Thibeault, LLP

(57) ABSTRACT

The invention features a reflective display device and a method of making a reflective display device that has reduced light loss and/or pixel cross talk due to internal reflection. The device includes a window layer, a plurality of reflective particles, a material portion disposed between the window layer and the plurality of reflective particles, and a refractive layer disposed between the window and the material portion. The plurality of reflective particles scatters light received from the ambient environment. The window layer has an index of refraction that is greater than an index of refraction of the ambient environment. The refractive layer has an index of refraction that is less than the index of refraction of the window layer and less than an index of refraction of the material portion.

32 Claims, 20 Drawing Sheets

U.S. PATENT DOCUMENTS

| | | |
|---|---|---|
| 4,062,009 A | 12/1977 | Raverdy et al. |
| 4,068,927 A | 1/1978 | White |
| 4,071,430 A | 1/1978 | Liebert |
| 4,087,376 A | 5/1978 | Foris et al. |
| 4,088,395 A | 5/1978 | Giglia |
| 4,093,534 A | 6/1978 | Carter et al. |
| 4,104,520 A | 8/1978 | Lewis et al. |
| 4,123,346 A | 10/1978 | Ploix |
| 4,126,528 A | 11/1978 | Chiang |
| 4,126,854 A | 11/1978 | Sheridon |
| 4,143,103 A | 3/1979 | Sheridon |
| 4,143,472 A | 3/1979 | Murata et al. |
| 4,147,932 A | 4/1979 | Lewis |
| 4,149,149 A | 4/1979 | Miki et al. |
| 4,166,800 A | 9/1979 | Fong |
| 4,196,437 A | 4/1980 | Hertz |
| 4,201,691 A | 5/1980 | Asher et al. |
| 4,203,106 A | 5/1980 | Dalisa et al. |
| 4,211,668 A | 7/1980 | Tate |
| 4,218,302 A | 8/1980 | Dalisa et al. |
| 4,231,641 A | 11/1980 | Randin |
| 4,261,653 A | 4/1981 | Goodrich |
| 4,272,596 A | 6/1981 | Harbour et al. |
| 4,273,672 A | 6/1981 | Vassiliades |
| 4,285,801 A | 8/1981 | Chiang |
| 4,287,337 A | 9/1981 | Guglielmetti et al. |
| 4,298,448 A | 11/1981 | Müller et al. |
| 4,305,807 A | 12/1981 | Somlyody |
| 4,311,361 A | 1/1982 | Somlyody |
| 4,314,013 A | 2/1982 | Chang |
| 4,324,456 A | 4/1982 | Dalisa |
| 4,368,952 A | 1/1983 | Murata et al. |
| 4,390,403 A | 6/1983 | Batchelder |
| 4,418,346 A | 11/1983 | Batchelder |
| 4,419,383 A | 12/1983 | Lee |
| 4,438,160 A | 3/1984 | Ishikawa et al. |
| 4,439,507 A | 3/1984 | Pan et al. |
| 4,444,961 A | 4/1984 | Timm |
| 4,450,440 A | 5/1984 | White |
| 4,502,934 A | 3/1985 | Gazard et al. |
| 4,522,472 A | 6/1985 | Liebert et al. |
| 4,543,306 A | 9/1985 | Dubois et al. |
| 4,605,284 A | 8/1986 | Fergason |
| 4,620,916 A | 11/1986 | Zwemer et al. |
| 4,623,706 A | 11/1986 | Timm et al. |
| 4,643,528 A | 2/1987 | Bell, Jr. |
| 4,648,956 A | 3/1987 | Marshall et al. |
| 4,655,897 A | 4/1987 | DiSanto et al. |
| 4,666,673 A | 5/1987 | Timm |
| 4,707,080 A | 11/1987 | Fergason |
| 4,732,830 A | 3/1988 | DiSanto et al. |
| 4,742,345 A | 5/1988 | DiSanto et al. |
| 4,746,917 A | 5/1988 | DiSanto et al. |
| 4,748,366 A | 5/1988 | Taylor |
| 4,833,464 A | 5/1989 | DiSanto et al. |
| 4,889,603 A | 12/1989 | DiSanto et al. |
| 4,891,245 A | 1/1990 | Micale |
| 4,909,959 A | 3/1990 | Lemaire et al. |
| 4,919,521 A | 4/1990 | Tada et al. |
| 4,931,019 A | 6/1990 | Park |
| 4,947,219 A | 8/1990 | Boehm |
| 5,009,490 A | 4/1991 | Kouno et al. |
| 5,017,225 A | 5/1991 | Nakanishi et al. |
| 5,041,824 A | 8/1991 | DiSanto et al. |
| 5,053,763 A | 10/1991 | DiSanto et al. |
| 5,057,363 A | 10/1991 | Nakanishi |
| 5,059,694 A | 10/1991 | Delabouglise et al. |
| 5,066,105 A | 11/1991 | Yoshimoto et al. |
| 5,066,559 A | 11/1991 | Elmasry et al. |
| 5,066,946 A | 11/1991 | DiSanto et al. |
| 5,070,326 A | 12/1991 | Yoshimoto et al. |
| 5,077,157 A | 12/1991 | DiSanto et al. |
| 5,082,351 A | 1/1992 | Fergason |
| 5,099,256 A | 3/1992 | Anderson |
| 5,105,185 A | 4/1992 | Nakanowatari et al. |
| 5,128,226 A | 7/1992 | Hung |
| 5,128,785 A | 7/1992 | Yoshimoto et al. |
| 5,132,049 A | 7/1992 | Garreau et al. |
| 5,138,472 A | 8/1992 | Jones et al. |
| 5,149,826 A | 9/1992 | Delabouglise et al. |
| 5,151,032 A | 9/1992 | Igawa |
| 5,174,882 A | 12/1992 | DiSanto et al. |
| 5,177,476 A | 1/1993 | DiSanto et al. |
| 5,185,226 A | 2/1993 | Grosso et al. |
| 5,187,609 A | 2/1993 | DiSanto et al. |
| 5,204,424 A | 4/1993 | Roncali et al. |
| 5,216,416 A | 6/1993 | DiSanto et al. |
| 5,216,530 A | 6/1993 | Pearlman et al. |
| 5,223,115 A | 6/1993 | DiSanto et al. |
| 5,223,823 A | 6/1993 | DiSanto et al. |
| 5,233,459 A | 8/1993 | Bozler et al. |
| 5,247,290 A | 9/1993 | DiSanto et al. |
| 5,250,932 A | 10/1993 | Yoshimoto et al. |
| 5,250,938 A | 10/1993 | DiSanto et al. |
| 5,254,981 A | 10/1993 | DiSanto et al. |
| 5,262,098 A | 11/1993 | Crowley et al. |
| 5,266,098 A | 11/1993 | Chun et al. |
| 5,266,937 A | 11/1993 | DiSanto et al. |
| 5,268,448 A | 12/1993 | Buechner et al. |
| 5,270,843 A | 12/1993 | Wang |
| 5,272,238 A | 12/1993 | Garnier et al. |
| 5,276,113 A | 1/1994 | Hashiguchi et al. |
| 5,276,438 A | 1/1994 | DiSanto et al. |
| 5,279,511 A | 1/1994 | DiSanto et al. |
| 5,279,694 A | 1/1994 | DiSanto et al. |
| 5,293,528 A | 3/1994 | DiSanto et al. |
| 5,296,974 A | 3/1994 | Tada et al. |
| 5,298,833 A | 3/1994 | Hou |
| 5,302,235 A | 4/1994 | DiSanto et al. |
| 5,303,073 A | 4/1994 | Shirota et al. |
| 5,304,439 A | 4/1994 | Disanto et al. |
| 5,315,312 A | 5/1994 | DiSanto et al. |
| 5,326,484 A | 7/1994 | Nakashima et al. |
| 5,344,594 A | 9/1994 | Sheridon |
| 5,359,346 A | 10/1994 | DiSanto et al. |
| 5,360,689 A | 11/1994 | Hou et al. |
| 5,380,362 A | 1/1995 | Schubert |
| 5,383,008 A | 1/1995 | Sheridon |
| 5,389,945 A | 2/1995 | Sheridon |
| 5,402,145 A | 3/1995 | DiSanto et al. |
| 5,403,518 A | 4/1995 | Schubert |
| 5,411,398 A | 5/1995 | Nakanishi et al. |
| 5,411,656 A | 5/1995 | Schubert |
| 5,421,926 A | 6/1995 | Yukinobu et al. |
| 5,463,492 A | 10/1995 | Check, III |
| 5,467,107 A | 11/1995 | DiSanto et al. |
| 5,498,674 A | 3/1996 | Hou et al. |
| 5,508,068 A | 4/1996 | Nakano |
| 5,512,162 A | 4/1996 | Sachs et al. |
| 5,528,399 A | 6/1996 | Izumi et al. |
| 5,543,177 A | 8/1996 | Morrison et al. |
| 5,543,219 A | 8/1996 | Elwakil |
| 5,552,679 A | 9/1996 | Murasko |
| 5,556,583 A | 9/1996 | Tashiro |
| 5,561,443 A | 10/1996 | DiSanto et al. |
| 5,565,885 A | 10/1996 | Tamanoi |
| 5,573,711 A | 11/1996 | Hou et al. |
| 5,582,700 A | 12/1996 | Bryning et al. |
| 5,583,675 A | 12/1996 | Yamada et al. |
| 5,597,889 A | 1/1997 | Takimoto et al. |
| 5,604,027 A | 2/1997 | Sheridon |

| | | | | | | |
|---|---|---|---|---|---|---|
| 5,604,070 A | 2/1997 | Rao et al. | | EP | 0 442 123 A1 | 8/1991 |
| 5,610,455 A | 3/1997 | Allen et al. | | EP | 0 443 571 A2 | 8/1991 |
| 5,614,340 A | 3/1997 | Bugner et al. | | EP | 0 525 852 B1 | 2/1993 |
| 5,627,561 A | 5/1997 | Laspina et al. | | EP | 0 525 852 A1 | 2/1993 |
| 5,635,317 A | 6/1997 | Taniguchi et al. | | EP | 0 540 281 A2 | 5/1993 |
| 5,638,103 A | 6/1997 | Obata et al. | | EP | 0 708 798 B1 | 5/1996 |
| 5,639,914 A | 6/1997 | Tomiyama et al. | | EP | 0 709 713 A2 | 5/1996 |
| 5,643,506 A | 7/1997 | Rourke | | EP | 0 721 176 A3 | 7/1996 |
| 5,643,673 A | 7/1997 | Hou | | EP | 0 721 176 A2 | 7/1996 |
| 5,650,199 A | 7/1997 | Chang et al. | | EP | 0 911 682 A2 | 4/1999 |
| 5,650,247 A | 7/1997 | Taniguchi et al. | | EP | 0 962 808 A2 | 12/1999 |
| 5,650,872 A | 7/1997 | Saxe et al. | | EP | 0 989 443 A2 | 3/2000 |
| 5,654,367 A | 8/1997 | Takimoto et al. | | EP | 1 024 540 A2 | 8/2000 |
| 5,663,224 A | 9/1997 | Emmons et al. | | GB | 1 314 906 | 4/1973 |
| 5,672,381 A | 9/1997 | Rajan | | GB | 1 465 701 | 3/1977 |
| 5,673,148 A | 9/1997 | Morris et al. | | GB | 2 044 508 A | 10/1980 |
| 5,676,884 A | 10/1997 | Tiers et al. | | GB | 2 292 119 A | 2/1996 |
| 5,688,584 A | 11/1997 | Casson et al. | | GB | 2 306 229 A | 4/1997 |
| 5,691,098 A | 11/1997 | Busman et al. | | GB | 2 324 273 A | 10/1998 |
| 5,693,442 A | 12/1997 | Weiss et al. | | JP | 53-73098 | 6/1978 |
| 5,694,224 A | 12/1997 | Tai | | JP | 54111368 | 8/1979 |
| 5,707,738 A | 1/1998 | Hou | | JP | 55096922 | 7/1980 |
| 5,707,747 A | 1/1998 | Tomiyama et al. | | JP | 60189731 | 9/1985 |
| 5,708,525 A | 1/1998 | Sheridon | | JP | 60197565 | 10/1985 |
| 5,709,976 A | 1/1998 | Malhotra | | JP | 62058222 | 3/1987 |
| 5,714,270 A | 2/1998 | Malhotra et al. | | JP | 62231930 | 10/1987 |
| 5,715,511 A | 2/1998 | Aslam et al. | | JP | 62269124 | 11/1987 |
| 5,716,550 A | 2/1998 | Gardner et al. | | JP | 62299824 | 12/1987 |
| 5,717,283 A | 2/1998 | Biegelsen et al. | | JP | 01086117 A | 3/1989 |
| 5,717,514 A | 2/1998 | Sheridon | | JP | 01086118 A | 3/1989 |
| 5,717,515 A | 2/1998 | Sheridon | | JP | 64 86116 | 3/1989 |
| 5,725,935 A | 3/1998 | Rajan | | JP | 01142537 A | 6/1989 |
| 5,729,632 A | 3/1998 | Tai | | JP | 01177517 | 7/1989 |
| 5,737,115 A | 4/1998 | Mackinlay et al. | | JP | 01248182 A | 10/1989 |
| 5,739,801 A | 4/1998 | Sheridon | | JP | 01267525 | 10/1989 |
| 5,745,094 A | 4/1998 | Gordon, II et al. | | JP | 02223934 A | 9/1990 |
| 5,751,268 A | 5/1998 | Sheridon | | JP | 02223935 A | 9/1990 |
| 5,753,763 A | 5/1998 | Rao et al. | | JP | 02223936 A | 9/1990 |
| 5,754,332 A | 5/1998 | Crowley | | JP | 02284124 A | 11/1990 |
| 5,759,671 A | 6/1998 | Tanaka et al. | | JP | 02284125 A | 11/1990 |
| 5,760,761 A | 6/1998 | Sheridon | | JP | 3-053224 | 3/1991 |
| 5,767,826 A | 6/1998 | Sheridon et al. | | JP | 3-091722 | 4/1991 |
| 5,777,782 A | 7/1998 | Sheridon | | JP | 3-096925 | 4/1991 |
| 5,783,614 A | 7/1998 | Chen et al. | | JP | 04307512 A | 10/1992 |
| 5,808,783 A | 9/1998 | Crowley | | JP | 4-307523 | 10/1992 |
| 5,825,529 A | 10/1998 | Crowley | | JP | 04345133 A | 12/1992 |
| 5,828,432 A | 10/1998 | Shashidhar et al. | | JP | 5-61421 | 3/1993 |
| 5,843,259 A | 12/1998 | Narang et al. | | JP | 05165064 A | 6/1993 |
| 5,900,858 A | 5/1999 | Richley | | JP | 05173194 A | 7/1993 |
| 5,914,806 A | 6/1999 | Gordon II et al. | | JP | 05307197 A | 11/1993 |
| 5,930,026 A | 7/1999 | Jacobson et al. | | JP | 6089081 | 3/1994 |
| 5,961,804 A | 10/1999 | Jacobson et al. | | JP | 6-202168 | 7/1994 |
| 6,014,247 A | 1/2000 | Winter et al. | | JP | 2551783 | 8/1996 |
| 6,064,784 A | 5/2000 | Whitehead et al. | | JP | 08234176 | 9/1996 |
| 6,113,810 A | 9/2000 | Hou et al. | | JP | 9-6277 | 1/1997 |
| 6,117,294 A | 9/2000 | Rasmussen | | JP | 950181574 | 2/1997 |
| 6,117,368 A | 9/2000 | Hou | | JP | 9-185087 | 7/1997 |
| 6,204,908 B1 | 3/2001 | Hashimoto et al. ......... 349/176 | | JP | 9-211499 | 8/1997 |
| 6,323,989 B1 | 11/2001 | Jacobson et al. ........... 359/296 | | JP | 09230391 | 9/1997 |
| | | | | JP | 10-48673 | 2/1998 |
| | FOREIGN PATENT DOCUMENTS | | | JP | 10-149118 A | 6/1998 |
| EP | 0 268 877 A3 | 6/1988 | | JP | 10-161161 | 6/1998 |
| EP | 0 268 877 A2 | 6/1988 | | JP | 11212499 A | 8/1999 |
| EP | 0 281 204 A2 | 9/1988 | | JP | 11219135 A | 8/1999 |
| EP | 0 325 013 A1 | 7/1989 | | JP | 11237851 A | 8/1999 |
| EP | 0 325 013 B1 | 7/1989 | | JP | 11352526 | 12/1999 |
| EP | 0 361 420 A2 | 4/1990 | | WO | WO 82/02961 | 9/1982 |
| EP | 0 375 005 B1 | 6/1990 | | WO | WO 92/17873 | 10/1992 |
| EP | 0 396 937 A2 | 11/1990 | | WO | WO 94/24236 | 10/1994 |
| EP | 0 404 545 A2 | 12/1990 | | WO | WO 95/02636 | 1/1995 |
| EP | 0 408 105 B1 | 1/1991 | | WO | WO 95/05622 | 2/1995 |

| | | |
|---|---|---|
| WO | WO 95/15363 | 6/1995 |
| WO | WO 95/19227 | 7/1995 |
| WO | WO 95/27924 | 10/1995 |
| WO | WO 95/33085 | 12/1995 |
| WO | WO 97/04398 | 2/1997 |
| WO | WO 97/24715 | 7/1997 |
| WO | WO 97/24907 | 7/1997 |
| WO | WO 98/03896 | 1/1998 |
| WO | WO 98/19028 | 5/1998 |
| WO | WO 98/41898 | 9/1998 |
| WO | WO 98/41899 | 9/1998 |
| WO | WO 98/58383 | 12/1998 |
| WO | WO 99/10767 | 3/1999 |
| WO | WO 99/10768 | 3/1999 |
| WO | WO 99/12170 | 3/1999 |
| WO | WO 99/26419 | 5/1999 |
| WO | WO 99/47970 | 9/1999 |
| WO | WO 99/53371 | 10/1999 |
| WO | WO 99/56171 | 11/1999 |
| WO | WO 99/65011 | 12/1999 |
| WO | WO 99/65012 | 12/1999 |
| WO | WO 00/05704 | 2/2000 |
| WO | WO 00/10048 | 2/2000 |
| WO | WO 01/29148 A1 | 4/2001 |

OTHER PUBLICATIONS

Sankus, J., "Electrophoretic Display Cell," *Xerox Disclosure Journal*, May/Jun. 1979, vol. 4, No. 3, p. 309.

Gutcho, "Microencapsulation with Synthetic Polymeric Film Formers," *Microcapsules and Microencapsulation Techniques*, 1976, pp. 65–130.

Gutcho, "Pigments and Paints," *Microcapsules and Microencapsulation Techniques*, 1976, pp. 178–193.

Ballinger et al., "Magnetic Recording Paper is Erasable," *Electronics*, Mar. 1, 1973, pp. 73–76.

Beilin et al., "2000–Character Electrophoretic Display," *SID 86 Digest*, 1986, pp. 136–140.

Blazo, S.F., "10.1/9:00 A.M.: High Resolution Electrophoretic Display with Photoconductor Addressing," *SID 82 Digest*, 1982, pp. 92–93.

Bohnke et al., "Polymer–Based Solid Electrochromic Cell for Matrix–Addressable Display Devices," *J. Electrochem Soc.*, 1991, vol. 138, No. 12, pp. 3612–3617.

Bryce, "Seeing Through Synthetic Metals," *Nature*, 1988, vol. 335, No. 1, pp. 12–13.

Chiang, "Conduction Mechanism of Charge Control Agents Used in Electrophretic Display Devices," *Proceedings of the S.I.D.*, 1977, vol. 18, Nos. 3 & 4, pp. 275–282.

Chiang et al., "A High Speed Electrophoretic Matrix Display," *SID 80 Digest*, 1980, pp. 114–115.

Comiskey et al., "Electrophoretic Ink: A Printable Display Material," *SID 99 Digest*, 1997, pp. 75–76.

Croucher et al., "Electrophoretic Display: Materials as Related to Performance," *Photographic Science and Engineering*, 1981, vol. 25, No. 2, pp. 80–86.

Dalisa, "Electrophoretic Display Technology," *Transactions on Electron Devices*, 1977, vol. 24, No. 7, pp. 827–34.

Egashira et al., "A Solid Electrochromic Cell Consisting of LU–Diphthalocyanine and Lead Fluroide," *Proceedings of the SID*, 1987, vol. 28, No. 3, pp. 227–232.

Fitzhenry, "Optical Effects of Adsorption of Dyes on Pigment Used in Electrophoretic Image Displays," *Applied Optics*, 1979, vol. 18, No. 19, pp. 3332–3337.

Fitzhenry, "Optical Properties of Electrophoretic Image Displays," *Proceedings of the SID*, 1981, vol. 22, No. 4, pp. 300–309.

Goodman, "Pasive Liquid Displays: Liquid Crystals, Electrophoretics, and Electrochromics," *Proceeding of the SID*, 1976, vol. 17, No. 1, pp. 30–38.

Gutcho, "Additional Uses for Encapsulated Products," *Microencapsules and Microencapsulation Techniques*, 1976, pp. 307–312.

Hatano et al., "Bistable Paper–White Display Device Using Cholesteric Liquid Crystals," *SID 96 Digest*, 1996, pp. 269–272.

Ji et al., "P–50: Polymer Walls in Higher–Polymer–Content Bistable Reflective Cholesteric Displays," *SID 96 Digest*, ; 1996, pp. 611–613.

Jin et al., "Optically Transparent, Electrically Conductive Composite Medium," *Science*, 1992, pp. 446–448.

Lee, L., "Fabrication of Magnetic Particles Display," *Proceeding of the SID*, 1977, vol. 18, Nos. 3 & 4, pp. 283–288.

Lewis et al., "Gravitational, Inter–Particle and ParticleElectrode Forces in the Electrophoretic Display," *Proceedings of the SID*, 1977, vol. 18, Nos. 3 & 4, pp. 235–242.

Mürau et al., "The Understanding and Elimination of Some Suspension Instabilities in an Electrophoretic Display," *J. Appl. Phys.*, 1987, vol. 49, No. 9, pp. 4820–4829.

Mürau et al., "An Electrophoretic Radiographic Device," *SID 79 Digest*, 1979, pp. 46–47.

Vaz et al., "Dual Frequency Addressing of Polymer–Dispensed Liquid–Crystal Films," *Journal of Applied Physics*, Jun. 1989, vol. 65, No. 12, pp. 5043–5049.

Ota et al., "Developments in Electrophoretic Displays," *Proceedings of the SID*, 1977, vol. 18, Nos. 3 & 4, pp. 243–254.

Ota et al., "Electrophoretic Display Devices," *Laser 75 Optoelectronics Conference Proceedings*, pp. 145–148.

Ota et al., "Electrophoretic Image Display (EPID) Panel," *Proceedings of the IEEE*, 1973, pp. 1–5.

Pankove, J., "Color Reflection Type Display Panel," *RCA Technical Notes*, 1962, No. 535: 2.

Pearlstein, F., "Electroless Plating," *Modern Electroplating*, pp. 710–747.

Saitoh, M. et al., "A Newly Developed Electrical Twisting Ball Display," *Proceedings of the SID*, 1982 vol. 23, No. 4, pp. 249–253.

Sheridon et al., "The Gyricon—A Twisting Ball Display," *Proceedings of the SID*, 1977, vol. 18, Nos. 3 & 4, pp. 289–293.

Shiffman, R.R. et al., "An Electrophoretic Image Display with Internal NMOS Address Logic and Display Drivers," *Proceedings of the SID*, 1984, vol. 25, No. 2, pp. 105–115.

Shiwa, S. et al., "5.6 Electrophoretic Display Method Using Ionographic Technology," *SID 88 Digest*, 1988, pp. 61–62.

Singer, B. et al., "An X-Y Addressable Electrophoretic Display," *Proceeding of the SID*, 1977, vol. 18, Nos. 3 & 4, pp. 255–266.

"Electronic Book is a Whole Library," *The Sunday Times, Book Review*, Feb. 25, 1996.

Vance, "Optical Characteristics of Electrophoretic Displays," *Proceeding of the SID*, 1977, vol. 18, Nos. 3 & 4, pp. 267–274.

Yamaguchi, M. et al., "Equivalent Circuit of Ion Projection-Driven Electrophoretic Display," *IEICE Transactions*, 1991, vol. 74, No. 12, pp. 4152–4156.

Yang et al., "A New Architecture of Polymer Transistors," *Nature*, 1994, vol. 372, pp. 344–346.

Zollinger, "Structure of Simple Di–and Triarylmethine Dyes and Their Aza Analogues," *Color Chemistry, Synthesis, Properties and Applications of Organic Dyes and Pigments,* 2nd, Rev. Edition, VCH, Weinheim, 1991, pp. 73.

"Electronic Ink' Sign Debuts at JCPenney," *Boston Globe,* May 4, 1999, p.C9.

Flaherty, J., "What Did Disappearing Ink Grow Up to Be? Electronic Ink," *The New York Times,* May 6, 1999.

Negroponte & Jacobson, "Surfaces and Displays," *Wired,* Jan. 1997, p. 212.

Comiskey, B. et al., "An Electrophoretic Ink for All–Printed Reflective Electronic Displays," *Nature,* Jul. 16, 1998, vol. 394, pp. 253–255.

Zurer, P., "Digital Ink Brings Electronic Books Closer," *Chemical,* Jul. 20, 1998, pp. 12–13.

Peterson, I., "Rethinking Ink. Printing the Pages of an Electronic Book," *Science News,* Jun. 20, 1998, vol., 153, pp. 396–397.

Guernsey L., "Beyond Neon: Electronic Ink," *New York Times,* B11, Col. 3, Jun. 3, 1999, p. 11.

White, R., "An Electrophoretic Bar Graph Display," *Proceedings of the SID,* 1981, vol. 22 No. 3, pp. 173–180.

Pansu et al., "Structures of Thin Layers of Hard Spheres: High Pressure Limit," *J. Physique,* Feb. 1984, vol. 45, pp. 331–339.

Peiranski et al. (1983), "Thin Colloidal Crystals," *Physical Review Letters,* Mar. 21, 1983, vol. 50, No. 12, pp. 900–903.

Pansu et al., "Thin Colloidal Crystals: A Series of Structural Transitions," *J. Physique,* Apr. 1983, vol. 44, pp. 531–536.

Van Winkle et al., "Layering Transitions in Colloidal Crystals as Observed by Diffraction and Direct–Lattice Imaging", *Physical Review,* Jul. 1986, vol. 34, No. 1, pp. 562–573.

Chiang, "A Stylus Writable Electrophoretic Display Device," *SID 79 Digest,* pp. 44–45.

Nakamura et al., "Development of Electrophoretic Display Using Microencapsulated Suspension," *1998 SID International Symposium Digest of Technical Papers—vol. 29, Proceedings of SID '98 International Symposium, Anaheim, CA, USA,* May 1998, pp. 1014–1017.

Ridley et al., "All–Inorganic Field Effect Transistors Fabricated by Printing," *Science,* Oct. 22, 1999, vol. 286, pp. 746–748.

Dabbousi et al., "Electroluminescece from CdSe Quantum-Dot/Polymer Composites," *Appl. Phys. Lett.,* Mar. 1995, vol. 66, No. 11, pp. 1316–1318.

Huang et al., "Photoluminescence and Electroluminescence of ZnS:Cu Nanocrystals in Polymeric Networks," *Appl. Phys. Lett.,* May 5, 1997, vol. 70, No. 18, pp. 2335–2337.

Vandegaer, Jan E., "Microencapsulation: Processes and Applications ed., " *American Chemical Society Symposium,* Chigaco, IL, 1973, pp. v–x, 1–180 (published by Plenum Press, New York, 1974).

Drzaic et al., "A Printed and Rollable Bistable Electronic Display," *1998 SID International Symposium, Digest of Technical Papers,* 1998, vol. 29, pp. 1131–1134.

Shimoda et al., "Multicolor Pixel Patterning of Light–Emitting Polymers by Ink–Jet Printing," *SID 99 Digest,* May 1999, pp. 377–379.

Nakabu, S. et al., "The Development of Super–High Aperture Ratio With Low–Electrically Resistive Material for High–Resolution TFT–LCD's," *SID 99 Digest,* pp. 732–735.

Luckham, P.F. et al., "The Controlled Flocculation of Particulate Dispersion Using Small Particles of Opposite Charge. II. Investigation of Floc Structure Using a Freeze–Fracture Technique," *Colloids and Surfaces,* 1983, vol. 6, pp. 83–95.

Luckham, P.F. et al., "The Controlled Flocculation of Particulate Dispersion Using Small Particles of Opposite Charge. III. Investigation of Floc Structure Using a Freeze–Fracture Technique," *Colloids and Surfaces,* 1983, vol. 6, pp. 101–118.

Vincent, B. et al., "Absorption of Small, Positive Particles onto Large, Negative Particles in the Presence of Polymer," *J.C.S. Faraday 1,* 1980, vol. 76, pp. 665–673.

Lee, L., "A Magnetic–Particles Display," *Proc. Soc. Inf. Disp. (USA),* 1975, vol. 16, No. 3, pp. 177–184.

Tsutsui et al., "Doubling Coupling–Out Efficiency in Organic Light–Emitting Devices Using a Thin Silica Aerogel Layer," *Advanced Materials,* 2001, vol. 13, No. 15, pp. 1149–1152.

International Search report for PCT/US02/40004, filed Dec. 13, 2002.

ELECTROPHORETIC ELECTRONIC DISPLAYS WITH LOW-INDEX FILMS

CROSS-REFERENCE TO RELATED APPLICATIONS

The present application claims priority to and benefit of U.S. provisional patent application Ser. No. 60/341,183 filed Dec. 13, 2001, the entire disclosure of which is incorporated herein by reference.

FIELD OF THE INVENTION

The present invention relates to displays, and, in particular, to black and white and color electrophoretic displays.

BACKGROUND OF THE INVENTION

Electrophoretic displays typically use reflective and absorbing pigments to produce optical performance that dramatically differs from traditional electronic displays. The white pigments, for example, used in the electrophoretic displays typically reflect light by a multiple scattering mechanism. The pigments thus are isotropic diffusers that create a Lambertian distribution of light reflected from a pigment surface. Electrophoretic displays thus typically have a light output intensity that approximates a Lambertian distribution. The output of reflective liquid crystal displays, in contrast, has an intensity that varies substantially with viewing direction.

Certain optical inefficiencies exist, however, in the typical electrophoretic display. In a typical electrophoretic display, a sizable fraction of light scatters from the reflective pigment at a steep angle relative to the normal to the scattering surface. A large portion of this scattered light then experiences internal reflection at the interface between the ambient air and the front surface of the display. After internal reflection, the light has only a small chance of being "recycled" (i.e., reflected in a manner so as to be capable of being seen by an observer of the display), through re-scattering by a nearby pixel.

Internal reflection inefficiency can cause the brightness of the electrophoretic display to be reduced by up to 50% or more. Furthermore, re-scattering from neighboring pixels can cause undesirable optical cross-talk.

SUMMARY OF THE INVENTION

The present invention provides displays with reduced optical inefficiency. The invention features displays that include a refractive layer of low refractive index, a reflective portion, and an intermediate material portion having a higher refractive index than the refractive layer. A display medium can include the reflective portion, for example, a reflective particle, and can include an encapsulating structure, preferably thin, that in part resides between the reflective portion of the display medium and the low-index refraction layer. The reflective particle may be an electrophoretic particle. The encapsulating structure can be, for example, a capsule membrane or a binder.

When the encapsulating structure is thin, its interface with the low-index refraction layer is close to the reflective portion of the display medium. As a result, when light from a spot on the reflective portion of the display medium, for example, part of a pixel, reaches the interface between the encapsulating structure and the low-index refraction layer, the portion of the light that gets internally reflected is more likely to bounce back onto a second spot proximate to the first spot. In an embodiment, the two spots are of the same pixel. As a result, more light gets "recycled" and eventually reaches an observer of the display. Moreover, optical cross-talk is reduced because the internal reflection is more localized.

The invention can be applied to both monochrome and color electrophoretic displays. Moreover, the invention can be applied to other display materials or display designs that involve a Lambertian or near-Lambertian optical response.

Features of the invention can provide Lambertian displays having an increase in brightness of as much as 50% or more. The invention works for color filter-based displays as well as non-color displays.

In one embodiment, the low-index film is disposed between encapsulated reflecting particles and a front window of the display. The low-index film, however, can be disposed in a variety of other locations.

Accordingly, in a first aspect, the invention features a display. The display includes a window layer, a plurality of reflective particles, a material portion between the particles and window, and a refractive layer between the material portion and window. The window layer has an index of refraction that is greater than an index of refraction of the ambient environment, such as air. The plurality of reflective particles scatters light received from the ambient environment. The refractive layer is disposed between the display medium layer and the window layer. The refractive layer has an index of refraction that is less than the index of refraction of the window layer and less than an index of refraction of the material portion.

The reflective particles belong to a display medium layer. The reflective particles can be a component of an unencapsulated display medium layer, and the material portion can assist containment of the particles. Such a material portion can be one or more layers, for example, a barrier layer, which can be flexible or rigid.

Alternatively, the reflective particles and material portion can be components of an encapsulated display medium layer. The material portion can then be a portion of the encapsulated display medium layer that resides between the reflective particles and the refractive layer. The material portion can include, but is not limited to, for example, capsule membrane, binder, polymer film, and/or fluid.

The display can include one or more film layers between and in contact with the display medium layer and the refractive layer. These layers can include, for example, a capping layer and/or an electrically conductive layer. The portion of the encapsulating structure and the film layers can have a combined thickness that causes most internally reflected scattered light to return to the same pixel from which the light is scattered. The combined thickness can be, for example, less than 10 micrometers, or less than 3 micrometers. The film layers can have thicknesses in a range of, for example, 0.05 to 0.30 micrometer.

The refractive layer can include a vacuum or a gas-filled gap. Alternatively, the refractive layer can include a porous material and/or a composite material. The refractive layer can have a thickness greater than the longest wavelength of visible light incident upon the display. For example, the thickness can be greater than 1 micrometer.

In a second aspect, the invention features a method of making a display device. The method includes providing a window layer, a plurality of reflective particles, a material portion between the particles and window, and a refractive layer between the material portion and window. The window layer has an index of refraction that is greater than an index of refraction of the ambient environment, such as air. The plurality of reflective particles scatters light received from the ambient environment. The refractive layer is disposed between the display medium layer and the window layer. The refractive layer has an index of refraction that is less than the index of refraction of the window layer and less than an index of refraction of the material portion.

The method can include selecting a thickness of the material portion to cause most internally reflected scattered light to return to a same pixel.

BRIEF DESCRIPTION OF THE DRAWINGS

The invention is pointed out with particularity in the appended claims. The advantages of the invention described above, together with further advantages, may be better understood by referring to the following description taken in conjunction with the accompanying drawings. In the drawings, like reference characters generally refer to the same parts throughout the different views. Also, the drawings are not necessarily to scale, emphasis instead generally being placed upon illustrating the principles of the invention.

DETAILED DESCRIPTION

Figures 1A, 1B:
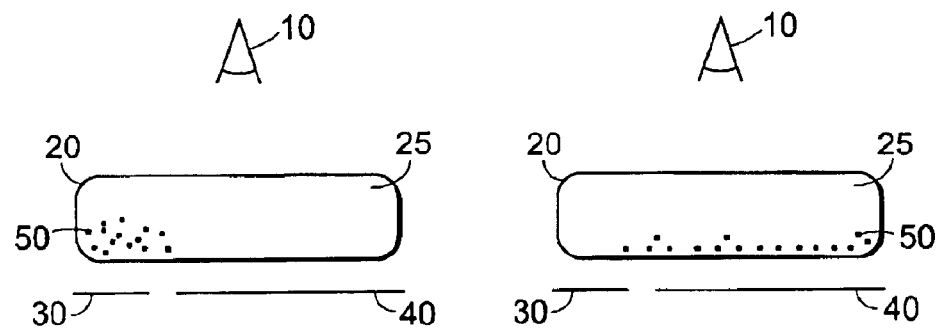
FIG. 1A is a diagrammatic side view of an embodiment of a rear-addressing electrode structure for a particle-based display in which the smaller electrode has been placed at a voltage relative to the large electrode causing the particles to migrate to the smaller electrode.
FIG. 1B is a diagrammatic side view of an embodiment of a rear-addressing electrode structure for a particle-based display in which the larger electrode has been placed at a voltage relative to the smaller electrode causing the particles to migrate to the larger electrode.

In the following embodiments of the invention, color electrophoretic displays are first described, with reference to FIGS. 1–16. Electrophoretic displays that include an optical biasing element are described, with reference to FIGS. 17–20. Illustrative embodiments of reflective displays that include a low refractive index ("low-index") film to enhance the optical characteristics of the displays are described with reference to FIGS. 21–25. It is to be recognized that all of the electrophoretic displays described herein and illustrated in the figures may include a low-index film according to the present invention. Lastly, various embodiments of materials that may be included in an electrophoretic display medium of the present invention are further described.

An electronic ink is an optoelectronically active material which comprises at least two phases: an electrophoretic contrast medium phase and a coating/binding phase. The electrophoretic phase comprises, in some embodiments, a single species of electrophoretic particles dispersed in a clear or dyed medium, or more than one species of electrophoretic particles having distinct physical and electrical characteristics dispersed in a clear or dyed medium. In some embodiments the electrophoretic phase is encapsulated, that is, there is a capsule wall phase, i.e., a membrane, between the two phases.

The coating/binding phase includes, in one embodiment, a polymer matrix that surrounds the electrophoretic phase. In this embodiment, the polymer in the polymeric binder is capable of being dried, crosslinked, or otherwise cured as in traditional inks, and therefore a printing process can be used to deposit the electronic ink onto a substrate. An electronic ink is capable of being printed by several different processes, depending on the mechanical properties of the specific ink employed. For example, the fragility or viscosity of a particular ink may result in a different process selection. A very viscous ink would not be well-suited to deposition by an inkjet printing process, while a fragile ink might not be used in a knife over roll coating process.

The optical quality of an electronic ink is quite distinct from other electronic display materials. The most notable difference is that the electronic ink provides a high degree of both reflectance and contrast because it is pigment based (as are ordinary printing inks). The light scattered from the electronic ink comes from a very thin layer of pigment close to the top of the viewing surface. In this respect it resembles an ordinary, printed image. Also, electronic ink is easily viewed from a wide range of viewing angles in the same manner as a printed page, and such ink approximates a Lambertian contrast curve more closely than any other electronic display material.

Since electronic ink can be printed, it can be included on the same surface with any other printed material, including traditional inks. Electronic ink can be made optically stable in all display configurations, that is, the ink can be set to a persistent optical state. Fabrication of a display by printing an electronic ink is particularly useful in low power applications because of this stability.

Electronic ink displays are novel in that they can be addressed by DC voltages and draw very little current. As such, the conductive leads and electrodes used to deliver the voltage to electronic ink displays can be of relatively high resistivity. The ability to use resistive conductors substantially widens the number and type of materials that can be used as conductors in electronic ink displays. In particular, the use of costly vacuum-sputtered indium tin oxide (ITO) conductors, a standard material in liquid crystal devices, is not required.

Aside from cost savings, the replacement of ITO with other materials can provide benefits in appearance, processing capabilities (printed conductors), flexibility, and durability. Additionally, the printed electrodes are in contact only with a solid binder, not with a fluid layer (like liquid crystals). This means that some conductive materials, which would otherwise dissolve or be degraded by contact with liquid crystals, can be used in an electronic ink application. These include opaque metallic inks for the rear electrode (e.g., silver and graphite inks), as well as conductive transparent inks for either substrate. These conductive coatings include semiconducting colloids, examples of which are indium tin oxide and antimony-doped tin oxide.

Organic conductors (polymeric conductors and molecular organic conductors) also may be used. Polymers include, but are not limited to, polyaniline and derivatives, polythiophene and derivatives, poly-3,4-ethylenedioxythiophene (PEDOT) and derivatives, polypyrrole and derivatives, and polyphenylenevinylene (PPV) and derivatives. Organic molecular conductors include, but are not limited to, derivatives of naphthalene, phthalocyanine, and pentacene. Polymer layers can be made thinner and more transparent than with traditional displays because conductivity requirements are not as stringent.

As an example, there is a class of materials called electroconductive powders, which are also useful as coatable transparent conductors in electronic ink displays. One example is Zelec ECP electroconductive powders from DuPont Chemical Co. of Wilmington, Del.

Referring now to FIGS. 1A and 1B, an addressing scheme for controlling particle-based displays is shown in which electrodes are disposed on only one side of a display, allowing the display to be rear-addressed. Utilizing only one side of the display for electrodes simplifies fabrication of displays. For example, if the electrodes are disposed on only the rear side of a display, both of the electrodes can be fabricated using opaque materials, because the electrodes do not need to be transparent.

FIG. 1A depicts a single capsule 20 of an encapsulated display media. In brief overview, the embodiment depicted in FIG. 1A includes a capsule 20 containing at least one particle 50 dispersed in a suspending fluid 25. The capsule 20 is addressed by a first electrode 30 and a second electrode 40. The two electrodes 30 and 40 may differ in "size." For example, the first electrode 30 may be smaller than the second electrode 40. The first electrode 30 and the second electrode 40 may be set to voltage potentials which affect the position of the particles 50 in the capsule 20.

The particles 50 may represent 0.1% to 20% of the volume enclosed by the capsule 20. In some embodiments the particles 50 represent 2.5% to 17.5% of the volume enclosed by capsule 20. In preferred embodiments, the particles 50 represent 5% to 15% of the volume enclosed by the capsule 20. In more preferred embodiments the particles 50 represent 9% to 11% of the volume defined by the capsule 20. In general, the volume percentage of the capsule 20 that the particles 50 represent should be selected so that the particles 50 expose most of the second, larger electrode 40 when positioned over the first, smaller electrode 30. As described in detail below, the particles 50 may be colored any one of a number of colors. The particles 50 may be either positively charged or negatively charged, or neutral in charge.

Still referring to FIGS. 1A and 1B, the particles 50 are dispersed in a dispersing fluid 25. The dispersing fluid 25 may have a low dielectric constant. The fluid 25 may be clear, or substantially clear, so that the fluid 25 does not inhibit viewing the particles 50 and the electrodes 30, 40 from position 10. In other embodiments, the fluid 25 is dyed. In some embodiments the dispersing fluid 25 has a specific densitymatched to the density of the particles 50. These embodiments can provide a bistable display media, because the particles 50 do not tend to move in certain compositions absent an electric field applied via the electrodes 30, 40.

The electrodes 30 and 40 should be sized and positioned appropriately so that together they address the entire capsule 20. There may be exactly one pair of electrodes (30, 40) addressing each capsule 20, multiple pairs of electrodes (30, 40) addressing each capsule 20, or a single pair of electrodes (30, 40) may address multiple capsules 20. In the embodiment shown in FIGS. 1A and 1B, the capsule 20 has a flattened, rectangular shape. In these embodiments, the electrodes 30, 40 should address most, or all, of the flattened surface area adjacent the electrodes 30, 40.

Figure 1C:
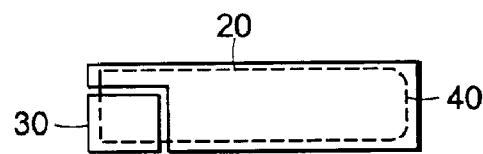
FIG. 1C is a diagrammatic top-down view of one embodiment of a rear-addressing electrode structure.

In one embodiment, the "smaller" electrode 30 may be less than one-half the "size" of the larger electrode 40. In preferred embodiments the smaller electrode is one-quarter the "size" of the larger electrode 40; in more preferred embodiments the smaller electrode 30 is one-eighth the "size" of the larger electrode 40. In even more preferred embodiments, the smaller electrode 30 is one-sixteenth the "size" of the larger electrode 40. It should be noted that reference to "smaller" in connection with the electrode 30 means that the electrode 30 addresses a smaller amount of the surface area of the capsule 20, not necessarily that the electrode 30 is physically smaller than the larger electrode 40. For example, multiple capsules 20 may be positioned such that less of each capsule 20 is addressed by the "smaller" electrode 30, even though both electrodes 30, 40 may be equal in their physical size. It should also be noted that, as shown in FIG. 1C, electrode 30 may address only a small corner of a rectangular capsule 20 (shown in phantom view in FIG. 1C), requiring the larger electrode 40 to surround the smaller electrode 30 on two sides in order to properly address the capsule 20. Selection of the percentage volume of the particles 50 and the electrodes 30, 40 in this manner allow the encapsulated display media to be addressed as described below.

Electrodes may be fabricated from any material capable of conducting electricity so that electrode 30, 40 may apply an electric field to the capsule 20. As noted above, the rear-addressed embodiments depicted in FIGS. 1A and 1B allow the electrodes 30, 40 to be fabricated from opaque materials such as solder paste, copper, copper-clad polyimide, graphite inks, silver inks and other metal-containing conductive inks. Alternatively, electrodes may be fabricated using transparent materials such as indium tin oxide and conductive polymers such as polyaniline or polythiopenes. Electrodes 30, 40 may be provided with contrasting optical properties. In some embodiments, one of the electrodes has an optical property complementary to optical properties of the particles 50.

In one embodiment, the capsule 20 contains positively charged black particles 50, and a substantially clear suspending fluid 25. The first, smaller electrode 30 is colored black, and is smaller than the second electrode 40, which is colored white or is highly reflective. When the smaller, black electrode 30 is placed at a negative voltage potential relative to larger, white electrode 40, the positively-charged particles 50 migrate to the smaller, black electrode 30. The effect to a viewer of the capsule 20 located at position 10 is a mixture of the larger, white electrode 40 and the smaller, black electrode 30, creating an effect which is largely white.

Referring to FIG. 1B, when the smaller, black electrode 30 is placed at a positive voltage potential relative to the larger, white electrode 40, particles 50 migrate to the larger, white electrode 40 and the viewer is presented a mixture of the black particles 50 covering the larger, white electrode 40 and the smaller, black electrode 30, creating an effect which is largely black. In this manner the capsule 20 may be addressed to display either a white visual state or a black visual state.

Other two-color schemes are provided by varying the color of the smaller electrode 30 and the particles 50 or by varying the color of the larger electrode 40. For example, varying the color of the larger electrode 40 allows fabrication of a rear-addressed, two-color display having black as one of the colors. Alternatively, varying the color of the smaller electrode 30 and the particles 50 allow a rear-addressed two-color system to be fabricated having white as one of the colors.

Further, it is contemplated that the particles 50 and the smaller electrode 30 can be of different colors. In these embodiments, a two-color display may be fabricated having a second color that is different from the color of the smaller electrode 30 and the particles 50. For example, a rear-addressed, orange-white display may be fabricated by providing blue particles 50, a red, smaller electrode 30, and a white (or highly reflective) larger electrode 40. In general, the optical properties of the electrodes 30, 40 and the particles 50 can be independently selected to provide desired display characteristics. In some embodiments the optical properties of the dispersing fluid 25 may also be varied, e.g. the fluid 25 may be dyed.

In other embodiments, the larger electrode 40 may be reflective instead of white. In these embodiments, when the particles 50 are moved to the smaller electrode 30, light reflects off the reflective surface 60 associated with the larger electrode 40 and the capsule 20 appears light in color, e.g. white (see FIG. 2A). When the particles 50 are moved to the larger electrode 40, the reflecting surface 60 is obscured and the capsule 20 appears dark (see FIG. 2B) because light is absorbed by the particles 50 before reaching the reflecting surface 60.

The reflecting surface 60 for the larger electrode 40 may possess retroflective properties, specular reflection properties, diffuse reflective properties or gain reflection properties. In certain embodiments, the reflective surface 60 reflects light with a Lambertian distribution. The surface 60 may be provided as a plurality of glass spheres disposed on the electrode 40, a diffractive reflecting layer such as a holographically formed reflector, a surface patterned to totally internally reflect incident light, a brightness-enhancing film, a diffuse reflecting layer, an embossed plastic or metal film, or any other known reflecting surface. The reflecting surface 60 may be provided as a separate layer laminated onto the larger electrode 40 or the reflecting surface 60 may be provided as a unitary part of the larger electrode 40.

Figure 2A:
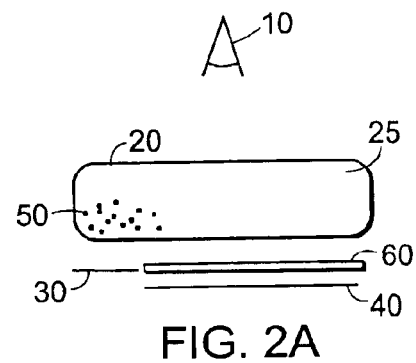
FIG. 2A is a diagrammatic side view of an embodiment of a rear-addressing electrode structure having a retroreflective layer associated with the larger electrode in which the smaller electrode has been placed at a voltage relative to the large electrode causing the particles to migrate to the smaller electrode.
Figure 2B:
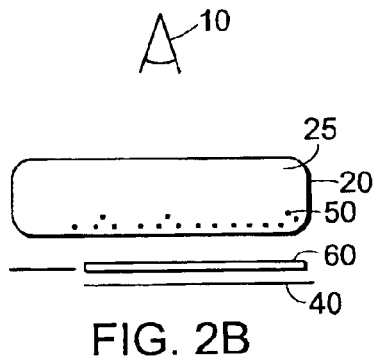
FIG. 2B is a diagrammatic side view of an embodiment of a rear-addressing electrode structure having a retroreflective layer associated with the larger electrode in which the larger electrode has been placed at a voltage relative to the smaller electrode causing the particles to migrate to the larger electrode.
Figure 2C:
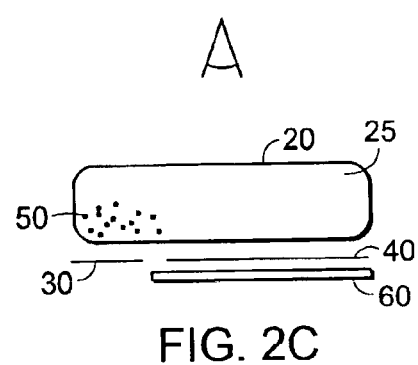
FIG. 2C is a diagrammatic side view of an embodiment of a rear-addressing electrode structure having a retroreflective layer disposed below the larger electrode in which the smaller electrode has been placed at a voltage relative to the large electrode causing the particles to migrate to the smaller electrode.
Figure 2D:
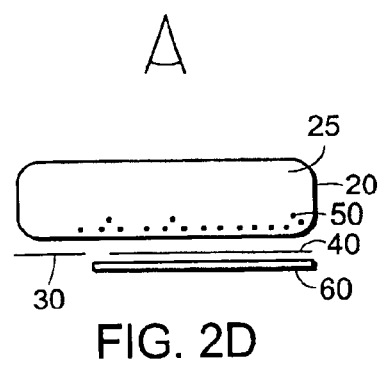
FIG. 2D is a diagrammatic side view of an embodiment of a rear-addressing electrode structure having a retroreflective layer disposed below the larger electrode in which the larger electrode has been placed at a voltage relative to the smaller electrode causing the particles to migrate to the larger electrode.

In the embodiments depicted by FIGS. 2C and 2D, the reflecting surface 60 may be disposed below the electrodes 30, 40 vis-à-vis the viewpoint 10. In these embodiments, electrode 30 may be transparent so that light may be reflected by surface 60. In other embodiments, proper switching of the particles may be accomplished with a combination of alternating-current (AC) and direct-current (DC) electric fields and described below in connection with FIGS. 3A–3D.

In still other embodiments, the rear-addressed display previously discussed can be configured to transition between largely transmissive and largely opaque modes of operation (referred to hereafter as "shutter mode"). Referring back to FIGS. 1A and 1B, in these embodiments the capsule 20 contains at least one positively-charged particle 50 dispersed in a substantially clear dispersing fluid 25. The larger electrode 40 is transparent and the smaller electrode 30 is opaque. When the smaller, opaque electrode 30 is placed at a negative voltage potential relative to the larger, transmissive electrode 40, the particles 50 migrate to the smaller, opaque electrode 30. The effect to a viewer of the capsule 20 located at position 10 is a mixture of the larger, transparent electrode 40 and the smaller, opaque electrode 30, creating an effect which is largely transparent.

Referring to FIG. 1B, when the smaller, opaque electrode 30 is placed at a positive voltage potential relative to the larger, transparent electrode 40, particles 50 migrate to the second electrode 40 and the viewer is presented a mixture of the opaque particles 50 covering the larger, transparent electrode 40 and the smaller, opaque electrode 30, creating an effect which is largely opaque. In this manner, a display formed using the capsules depicted in FIGS. 1A and 1B may be switched between transmissive and opaque modes. Such a display can be used to construct a window that can be rendered opaque. Although FIGS. 1A–2D depict a pair of electrodes associated with each capsule 20, it should be understood that each pair of electrodes may be associated with more than one capsule 20.

Figure 3A:
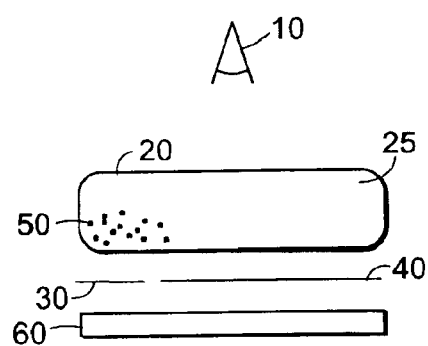
FIG. 3A is a diagrammatic side view of an embodiment of an addressing structure in which a direct-current electric field has been applied to the capsule causing the particles to migrate to the smaller electrode.

A similar technique may be used in connection with the embodiment of FIGS. 3A, 3B, 3C, and 3D. Referring to FIG. 3A, a capsule 20 contains at least one dark or black particle 50 dispersed in a substantially clear dispersing fluid 25. A smaller, opaque electrode 30 and a larger, transparent electrode 40 apply both direct-current (DC) electric fields and alternating-current (AC) fields to the capsule 20. A DC field can be applied to the capsule 20 to cause the particles 50 to migrate towards the smaller electrode 30. For example, if the particles 50 are positively charged, the smaller electrode is placed a voltage that is more negative than the larger electrode 40. Although FIGS. 3A–3D depict only one capsule per electrode pair, multiple capsules may be addressed using the same electrode pair.

The smaller electrode 30 is at most one-half the "size" of the larger electrode 40. In preferred embodiments the smaller electrode is one-quarter the "size" of the larger electrode 40; in more preferred embodiments the smaller electrode 30 is one-eighth the "size" of the larger electrode 40. In even more preferred embodiments, the smaller electrode 30 is one-sixteenth the "size" of the larger electrode 40.

Causing the particles 50 to migrate to the smaller electrode 30, as depicted in FIG. 3A, allows incident light to pass through the larger, transparent electrode 40 and be reflected by a reflecting surface 60. In shutter mode, the reflecting surface 60 is replaced by a translucent layer, a transparent layer, or a layer is not provided at all, and incident light is allowed to pass through the capsule 20, i.e. the capsule 20 is transmissive.

Figure 3B:
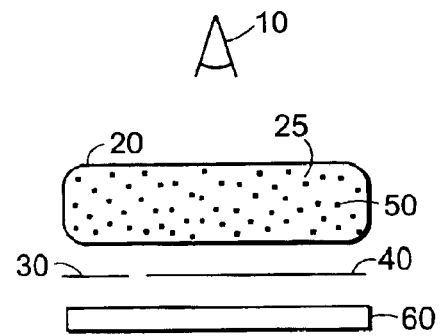
FIG. 3B is a diagrammatic side view of an embodiment of an addressing structure in which an alternating-current electric field has been applied to the capsule causing the particles to disperse into the capsule.

Referring now to FIG. 3B, the particles 50 are dispersed into the capsule 20 by applying an AC field to the capsule 20 via the electrodes 30, 40. The particles 50, dispersed into the capsule 20 by the AC field, block incident light from passing through the capsule 20, causing it to appear dark at the viewpoint 10. The embodiment depicted in FIGS. 3A–3B may be used in shutter mode by not providing the reflecting surface 60 and instead providing a translucent layer, a transparent layer, or no layer at all. In shutter mode, application of an AC electric field causes the capsule 20 to appear opaque. The transparency of a shutter mode display formed by the apparatus depicted in FIGS. 3A–3D may be controlled by the number of capsules addressed using DC fields and AC fields. For example, a display in which every other capsule 20 is addressed using an AC field would appear fifty percent transmissive.

Figure 3C:
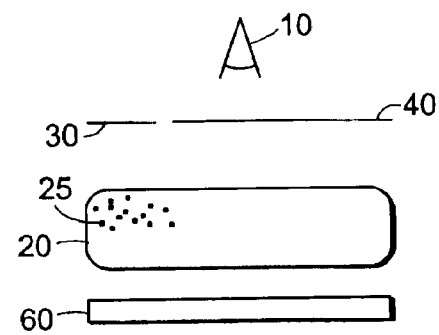
FIG. 3C is a diagrammatic side view of an embodiment of an addressing structure having transparent electrodes, in which a direct-current electric field has been applied to the capsule causing the particles to migrate to the smaller electrode.
Figure 3D:
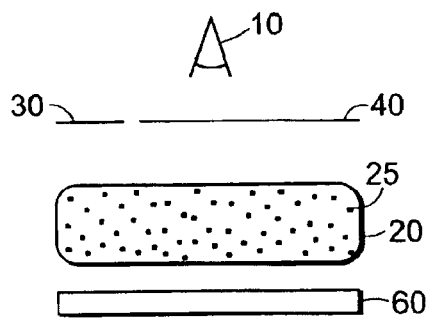
FIG. 3D is a diagrammatic side view of an embodiment of an addressing structure having transparent electrodes, in which an alternating-current electric field has been applied to the capsule causing the particles to disperse into the capsule.

FIGS. 3C and 3D depict an embodiment of the electrode structure described above in which electrodes 30, 40 are on "top" of the capsule 20, that is, the electrodes 30, 40 are between the viewpoint 10 and the capsule 20. In these embodiments, both electrodes 30, 40 should be transparent. Transparent polymers can be fabricated using conductive polymers, such as polyaniline, polythiophenes, or indium tin oxide. These materials may be made soluble so that electrodes can be fabricated using coating techniques such as spin coating, spray coating, meniscus coating, printing techniques, forward and reverse roll coating and the like. In these embodiments, light passes through the electrodes 30, 40 and is either absorbed by the particles 50, reflected by retroreflecting layer 60 (when provided), or transmitted throughout the capsule 20 (when retroreflecting layer 60 is not provided).

The addressing structure depicted in FIGS. 3A–3D may be used with electrophoretic display media and encapsulated electrophoretic display media. FIGS. 3A–3D depict embodiments in which electrode 30, 40 are statically attached to the display media. In certain embodiments, the particles 50 exhibit bistability, that is, they are substantially motionless in the absence of a electric field. In these embodiments, the electrodes 30, 40 may be provided as part of a "stylus" or other device which is scanned over the material to address each capsule or cluster of capsules. This mode of addressing particle-based displays will be described in more detail below in connection with FIG. 16.

Figure 4A:
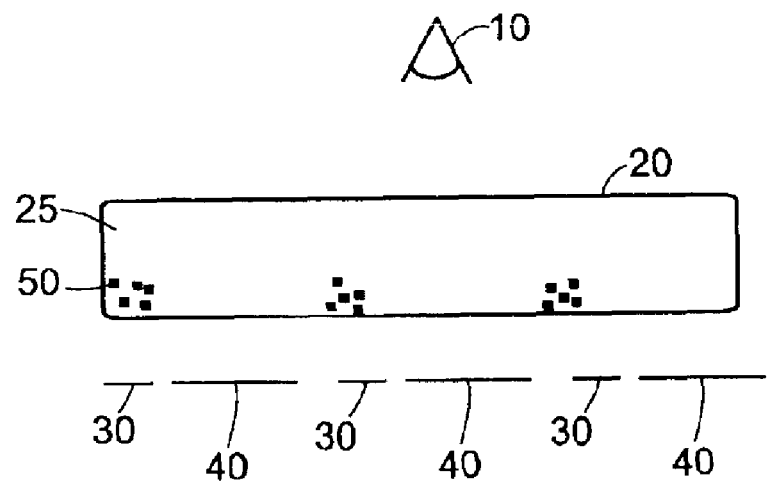
FIG. 4A is a diagrammatic side view of an embodiment of a rear-addressing electrode structure for a particle-based display in which multiple smaller electrodes have been placed at a voltage relative to multiple larger electrodes, causing the particles to migrate to the smaller electrodes.
Figure 4B:
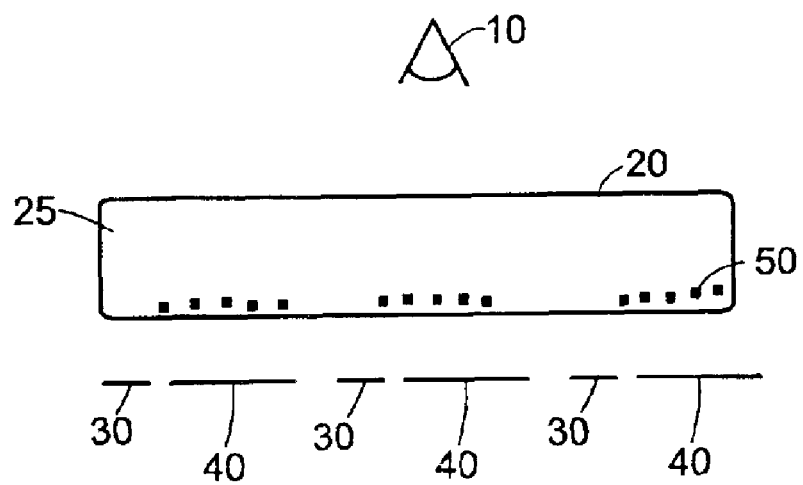
FIG. 4B is a diagrammatic side view of an embodiment of a rear-addressing electrode structure for a particle-based display in which multiple larger electrodes have been placed at a voltage relative to multiple smaller electrodes, causing the particles to migrate to the larger electrodes.

Referring now to FIGS. 4A and 4B, a capsule 20 of a electronically addressable media is illustrated in which the technique illustrated above is used with multiple rear-addressing electrodes. The capsule 20 contains at least one particle 50 dispersed in a clear suspending fluid 25. The capsule 20 is addressed by multiple smaller electrodes 30 and multiple larger electrodes 40. In these embodiments, the smaller electrodes 30 may be selected to collectively address equal or less than one-half the area the larger electrodes 40 addresses, in other words, no more than half the "size" of the electrodes 40. In further embodiments, the smaller electrodes 30 are collectively one-fourth the "size" of the larger electrodes 40. In further embodiments the smaller electrodes 30 are collectively one-eighth the "size" of the larger electrodes 40. In preferred embodiments, the smaller electrodes 30 are collectively one-sixteenth the "size" of the larger electrodes.

Each electrode 30 may be provided as separate electrodes that are controlled in parallel to control the display. For example, each separate electrode may be substantially simultaneously set to the same voltage as all other electrodes of that size. Alternatively, the electrodes 30, 40 may be interdigitated to provide the embodiment shown in FIGS. 4A and 4B.

Operation of the rear-addressing electrode structure depicted in FIGS. 4A and 4B is similar to that described above. For example, the capsule 20 may contain positively charged, black particles 50 dispersed in a substantially clear suspending fluid 25. The smaller electrodes 30 are colored black and the larger electrodes 40 are colored white or are highly reflective. Referring to FIG. 4A, the smaller electrodes 30 are placed at a negative potential relative to the larger electrodes 40, causing particles 50 migrate within the capsule to the smaller electrodes 30 and the capsule 20 appears to the viewpoint 10 as a mix of the larger, white electrodes 40 and the smaller, black electrodes 30, creating an effect which is largely white.

Referring to FIG. 4B, when the smaller electrodes 30 are placed at a positive potential relative to the larger electrodes 40, particles 50 migrate to the larger electrodes 40 causing the capsule 20 to display a mix of the larger, white electrodes 40 occluded by the black particles 50 and the smaller, black electrodes 30, creating an effect which is largely black. The techniques described above with respect to the embodiments depicted in FIGS. 1A and 1B for producing two-color displays work with equal effectiveness in connection with these embodiments.

Figure 5A:
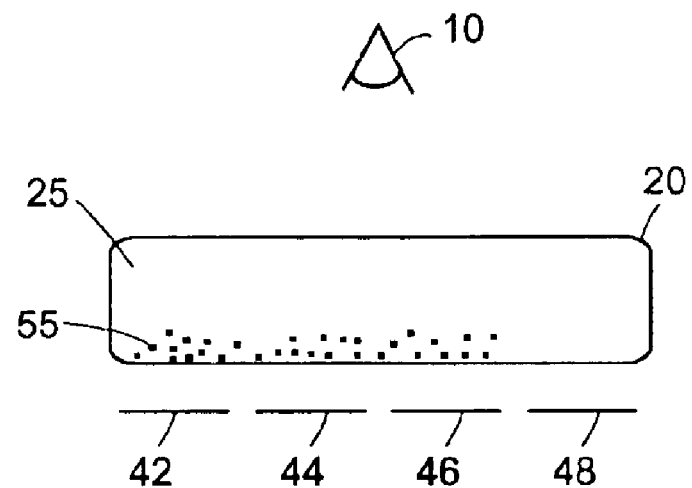
FIG. 5A is a diagrammatic side view of an embodiment of a rear-addressing electrode structure for a particle-based display having colored electrodes and a white electrode, in which the colored electrodes have been placed at a voltage relative to the white electrode causing the particles to migrate to the colored electrodes.
Figure 5B:
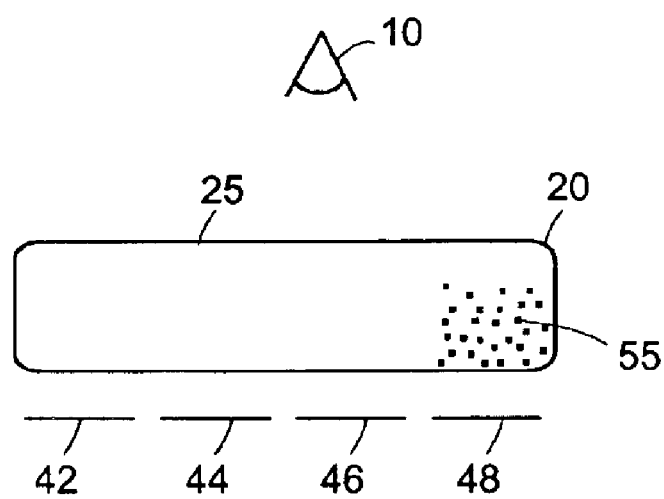
FIG. 5B is a diagrammatic side view of an embodiment of a rear-addressing electrode structure for a particle-based display having colored electrodes and a white electrode, in which the white electrode has been placed at a voltage relative to the colored electrodes causing the particles to migrate to the white electrode.

FIGS. 5A and 5B depict an embodiment of a rear-addressing electrode structure that creates a reflective color display in a manner similar to halftoning or pointillism. The capsule 20 contains white particles 55 dispersed in a clear suspending fluid 25. Electrodes 42, 44, 46, 48 are colored cyan, magenta, yellow, and white respectively. Referring to FIG. 5A, when the colored electrodes 42, 44, 46 are placed at a positive potential relative to the white electrode 48, negatively-charged particles 55 migrate to these three electrodes, causing the capsule 20 to present to the viewpoint 10 a mix of the white particles 55 and the white electrode 48, creating an effect which is largely white. Referring to FIG. 5B, when electrodes 42, 44, 46 are placed at a negative potential relative to electrode 48, particles 55 migrate to the white electrode 48, and the eye 10 sees a mix of the white particles 55, the cyan electrode 42, the magenta electrode 44, and the yellow electrode 46, creating an effect which is largely black or gray.

By addressing the electrodes, any color can be produced that is possible with a subtractive color process. For example, to cause the capsule 20 to display an orange color to the viewpoint 10, the yellow electrode 46 and the magenta electrode 42 are set to a voltage potential that is more positive than the voltage potential applied by the cyan electrode 42 and the white electrode 48. Further, the relative intensities of these colors can be controlled by the actual voltage potentials applied to the electrodes.

Figure 6:
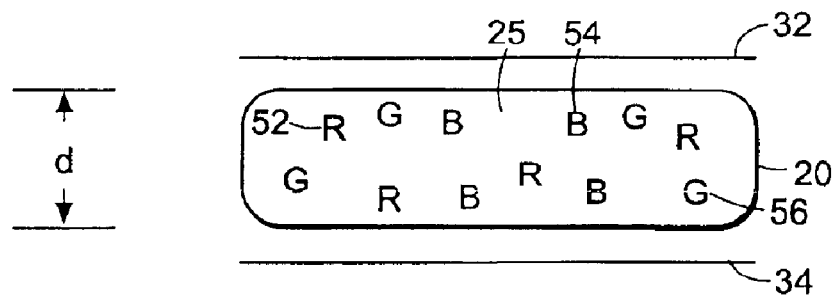
FIG. 6 is a diagrammatic side view of an embodiment of a color display element having red, green, and blue particles of different electrophoretic mobilities.

In another embodiment, depicted in FIG. 6, a color display is provided by a capsule 20 of size d containing multiple species of particles in a clear, dispersing fluid 25. Each species of particles has different optical properties and possess different electrophoretic mobilities ($\mu$) from the other species. In the embodiment depicted in FIG. 6, the capsule 20 contains red particles 52, blue particles 54, and green particles 56, and $$|\mu_R|>|\mu_B|>|\mu_G|$$

That is, the magnitude of the electrophoretic mobility of the red particles 52, on average, exceeds the electrophoretic mobility of the blue particles 54, on average, and the electrophoretic mobility of the blue particles 54, on average, exceeds the average electrophoretic mobility of the green particles 56. As an example, there may be a species of red particle with a zeta potential of 100 millivolts (mV), a blue particle with a zeta potential of 60 mV, and a green particle with a zeta potential of 20 mV. The capsule 20 is placed between two electrodes 32, 42 that apply an electric field to the capsule.

Figure 7A:
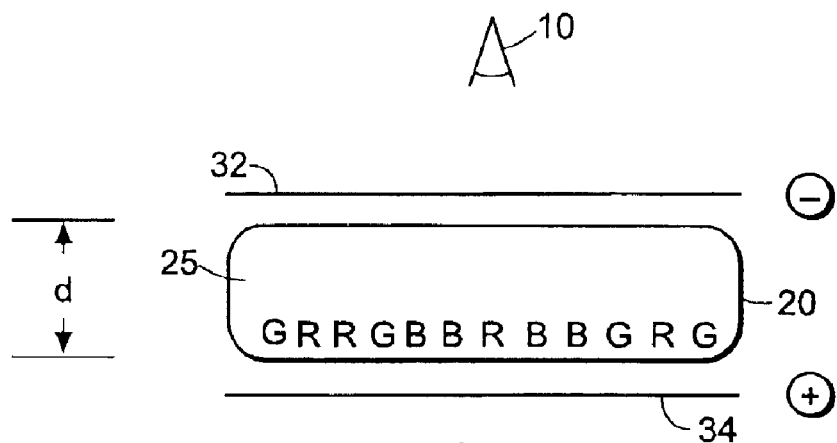
FIGS. 7A–7B depict the steps taken to address the display of FIG. 6 to display red.
Figure 7B:
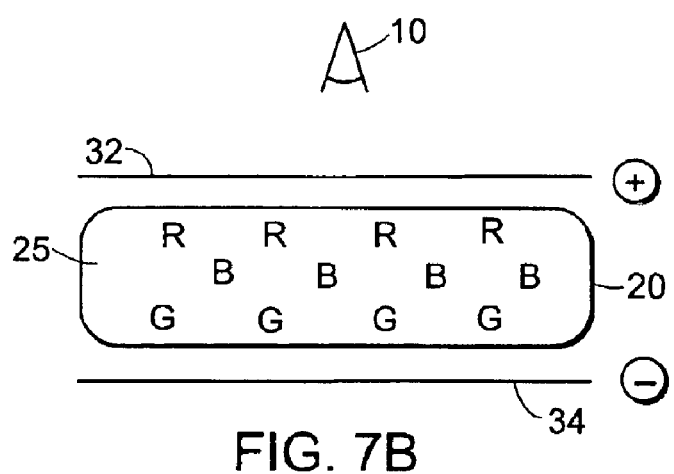

FIGS. 7A–7B depict the steps to be taken to address the display shown in FIG. 6 to display a red color to a viewpoint 10. Referring to FIG. 7A, all the particles 52, 54, 56 are attracted to one side of the capsule 20 by applying an electric field in one direction. The electric field should be applied to the capsule 20 long enough to attract even the more slowly moving green particles 56 to the electrode 34. Referring to FIG. 7B, the electric field is reversed just long enough to allow the red particles 52 to migrate towards the electrode 32. The blue particles 54 and green particles 56 will also move in the reversed electric field, but they will not move as fast as the red particles 52 and thus will be obscured by the red particles 52. The amount of time for which the applied electric field must be reversed can be determined from the relative electrophoretic mobilities of the particles, the strength of the applied electric field, and the size of the capsule.

Figure 8A:
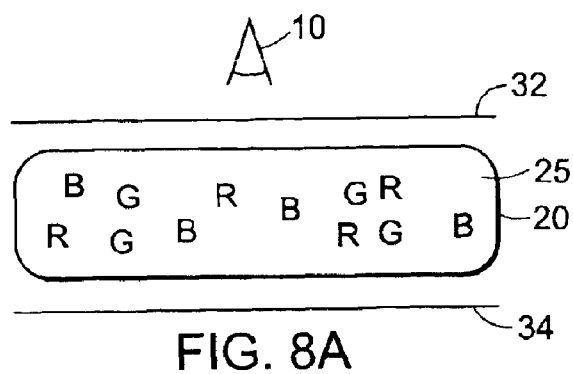
FIGS. 8A–8D depict the steps taken to address the display of FIG. 6 to display blue.
Figure 8B:
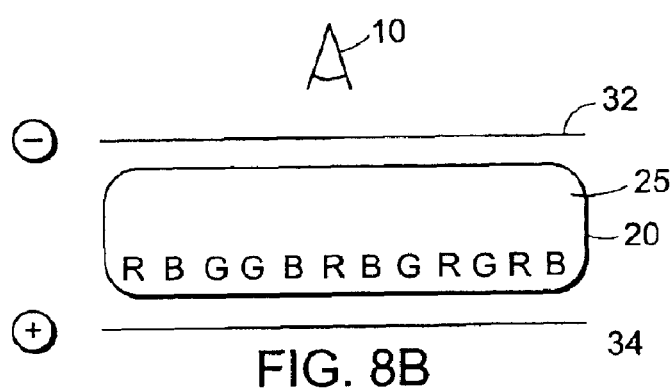
Figure 8C:
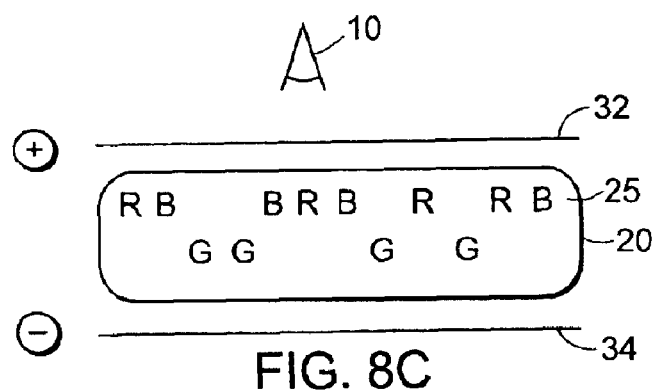
Figure 8D:
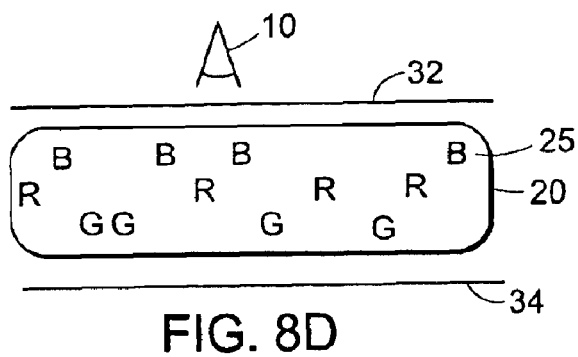

FIGS. 8A–8D depict addressing the display element to a blue state. As shown in FIG. 8A, the particles 52, 54, 56 are initially randomly dispersed in the capsule 20. All the particles 52, 54, 56 are attracted to one side of the capsule 20 by applying an electric field in one direction (shown in FIG. 8B). Referring to FIG. 8C, the electric field is reversed just long enough to allow the red particles 52 and blue particles 54 to migrate towards the electrode 32. The amount of time for which the applied electric field must be reversed can be determined from the relative electrophoretic mobilities of the particles, the strength of the applied electric field, and the size of the capsule. Referring to FIG. 8D, the electric field is then reversed a second time and the red particles 52, moving faster than the blue particles 54, leave the blue particles 54 exposed to the viewpoint 10. The amount of time for which the applied electric field must be reversed can be determined from the relative electrophoretic mobilities of the particles, the strength of the applied electric field, and the size of the capsule.

Figure 9A:
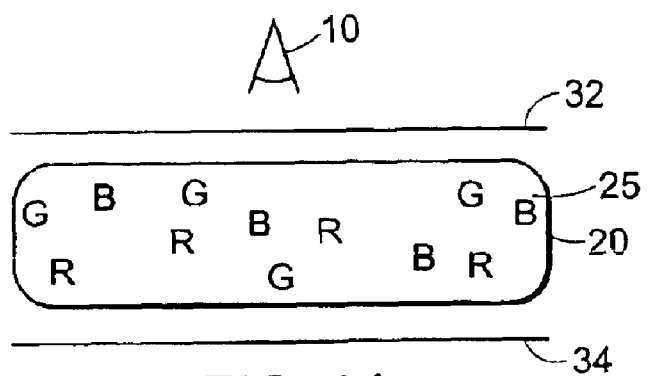
FIGS. 9A–9C depict the steps taken to address the display of FIG. 6 to display green.
Figure 9B:
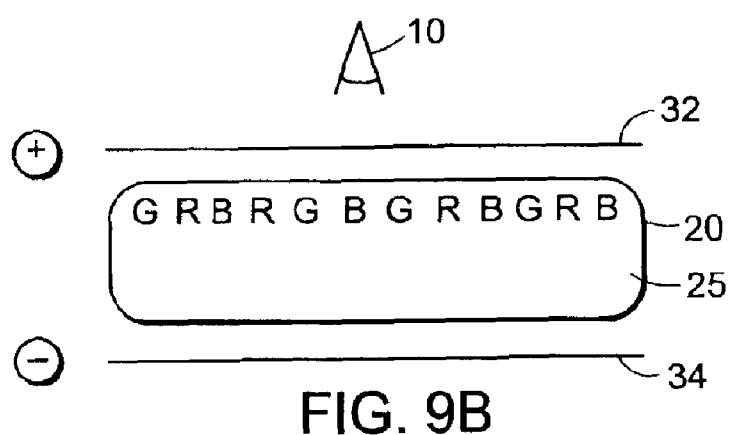
Figure 9C:
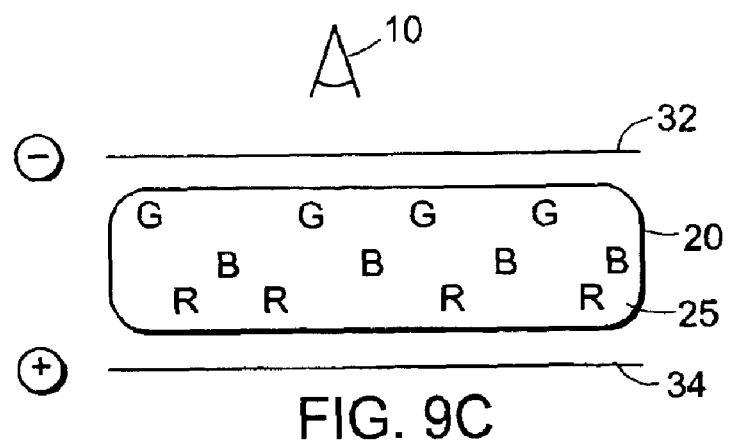

FIGS. 9A–9C depict the steps to be taken to present a green display to the viewpoint 10. As shown in FIG. 9A, the particles 52, 54, 56 are initially distributed randomly in the capsule 20. All the particles 52, 54, 56 are attracted to the side of the capsule 20 proximal the viewpoint 10 by applying an electric field in one direction. The electric field should be applied to the capsule 20 long enough to attract even the more slowly moving green particles 56 to the electrode 32. As shown in FIG. 9C, the electric field is reversed just long enough to allow the red particles 52 and the blue particles 54 to migrate towards the electrode 54, leaving the slowly-moving green particles 56 displayed to the viewpoint. The amount of time for which the applied electric field must be reversed can be determined from the relative electrophoretic mobilities of the particles, the strength of the applied electric field, and the size of the capsule.

In other embodiments, the capsule contains multiple species of particles and a dyed dispersing fluid that acts as one of the colors. In still other embodiments, more than three species of particles may be provided having additional colors. Although FIGS. 6–9C depict two electrodes associated with a single capsule, the electrodes may address multiple capsules or less than a full capsule In FIG. 10, the rear substrate 100 for a seven segment display is shown that improves on normal rear electrode structures by providing a means for arbitrarily connecting to any electrode section on the rear of the display without the need for conductive trace lines on the surface of the patterned substrate or a patterned counter electrode on the front of the display. Small conductive vias through the substrate allow connections to the rear electrode structure. On the back of the substrate, these vias are connected to a network of conductors. These conductors can be run so as to provide a simple connection to the entire display. For example, segment 112 is connected by via 114 through the substrate 116 to conductor 118. A network of conductors may run multiple connections (not shown) to edge connector 122. This connector can be built into the structure of the conductor such as edge connector 122. Each segment of the rear electrode can be individually addressed easily through edge connector 122. A continuous top electrode can be used with the substrate 116.

Figure 10:
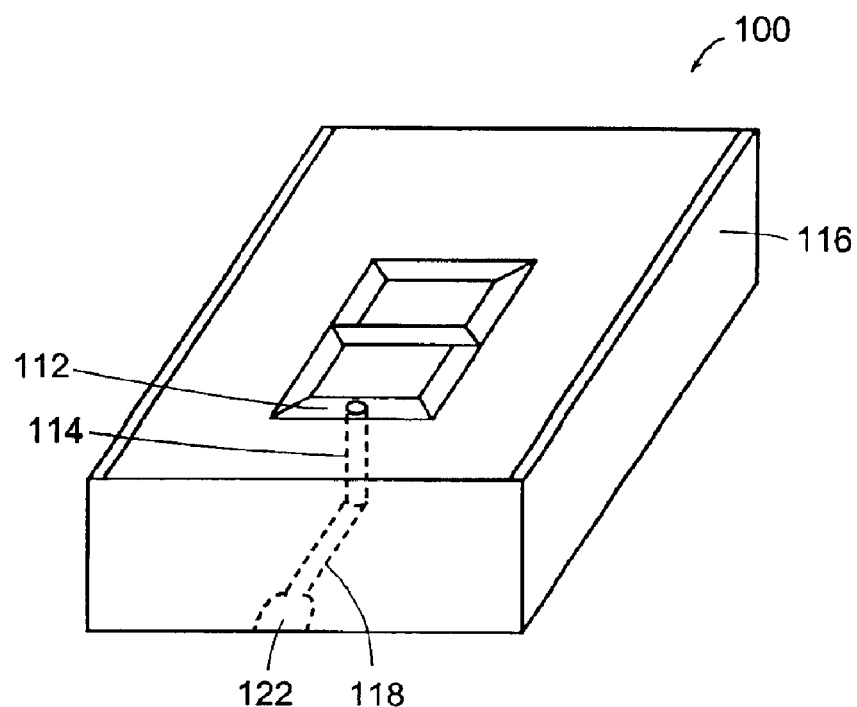
FIG. 10 is a perspective embodiment of a rear electrode structure for addressing a seven segment display.

The rear electrode structure depicted in FIG. 10 is useful for any display media, but is particularly advantageous for particle-based displays because such displays do not have a defined appearance when not addressed. The rear electrode should be completely covered in an electrically conducting material with room only to provide necessary insulation of the various electrodes. This is so that the connections on the rear of the display can be routed with out concern for affecting the appearance of the display. Having a mostly continuous rear electrode pattern assures that the display material is shielded from the rear electrode wire routing.

Figure 11:
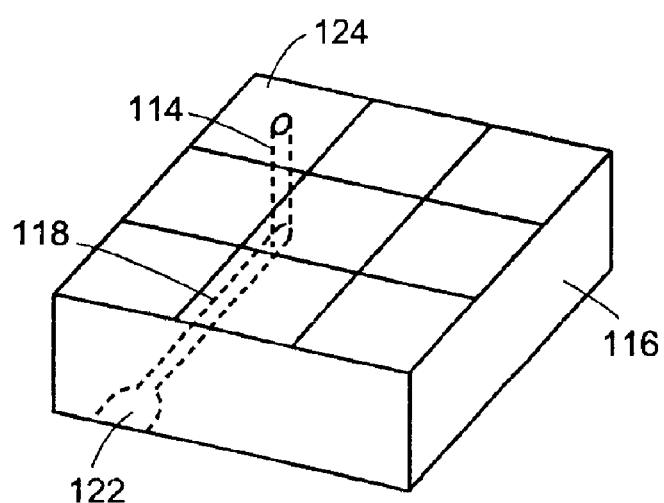
FIG. 11 is a perspective embodiment of a rear electrode structure for addressing a three by three matrix display element.

In FIG. 11, a 3×3 matrix is shown. Here, matrix segment 124 on a first side of substrate 116 is connected by via 114 to conductor 118 on a second side of substrate 116. The conductors 18 run to an edge and terminate in a edge connector 122. Although the display element of FIG. 11 shows square segments 124, the segments may be shaped or sized to form a predefined display pattern.

Figure 12:
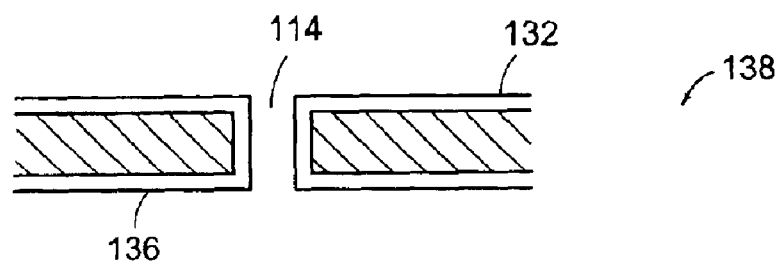
FIG. 12 is a cross-sectional view of a printed circuit board used as a rear electrode addressing structure.

In FIG. 12, a printed circuit board 138 is used as the rear electrode structure. The front of the printed circuit board 138 has copper pads 132 etched in the desired shape. There are plated vias 114 connecting these electrode pads to an etched wire structure 136 on the rear of the printed circuit board 138. The wires 136 can be run to one side or the rear of the printed circuit board 138 and a connection can be made using a standard connector such as a surface mount connector or using a flex connector and anisotropic glue (not shown). Vias may be filled with a conductive substance, such as solder or conductive epoxy, or an insulating substance, such as epoxy.

Alternatively, a flex circuit such a copper-clad polyimide may be used for the rear electrode structure of FIG. 10. Printed circuit board 138 may be made of polyimide, which acts both as the flex connector and as the substrate for the electrode structure. Rather than copper pads 132, electrodes (not shown) may be etched into the copper covering the polyimide printed circuit board 138. The plated vias 114 connect the electrodes etched onto the substrate the rear of the printed circuit board 138, which may have an etched conductor network thereon (the etched conductor network is similar to the etched wire structure 136).

Figure 13:
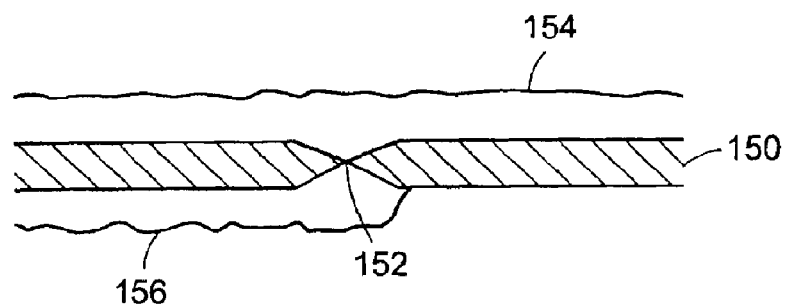
FIG. 13 is a cross-sectional view of a dielectric sheet used as a rear electrode addressing structure.

In FIG. 13, a thin dielectric sheet 150, such as polyester, polyimide, or glass can be used to make a rear electrode structure. Holes 152 are punched, drilled, abraded, or melted through the sheet where conductive paths are desired. The front electrode 154 is made of conductive ink printed using any technique described above. The holes should be sized and the ink should be selected to have a viscosity so that the ink fills the holes. When the back structure 156 is printed, again using conductive ink, the holes are again filled. By this method, the connection between the front and back of the substrate is made automatically.

Figure 14:
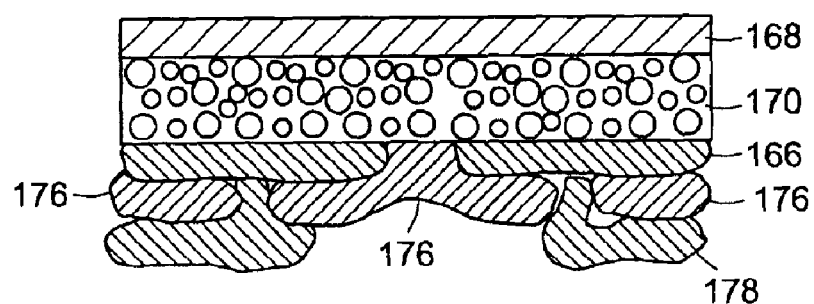
FIG. 14 is a cross-sectional view of a rear electrode addressing structure that is formed by printing.

In FIG. 14, the rear electrode structure can be made entirely of printed layers. A conductive layer 166 can be printed onto the back of a display comprised of a clear, front electrode 168 and a printable display material 170. A clear electrode may be fabricated from indium tin oxide or conductive polymers such as polyanilines and polythiophenes. A dielectric coating 176 can be printed leaving areas for vias. Then, the back layer of conductive ink 178 can be printed. If necessary, an additional layer of conductive ink can be used before the final ink structure is printed to fill in the holes.

This technique for printing displays can be used to build the rear electrode structure on a display or to construct two separate layers that are laminated together to form the display. For example an electronically active ink may be printed on an indium tin oxide electrode. Separately, a rear electrode structure as described above can be printed on a suitable substrate, such as plastic, polymer films, or glass. The electrode structure and the display element can be laminated to form a display.

Figure 15:
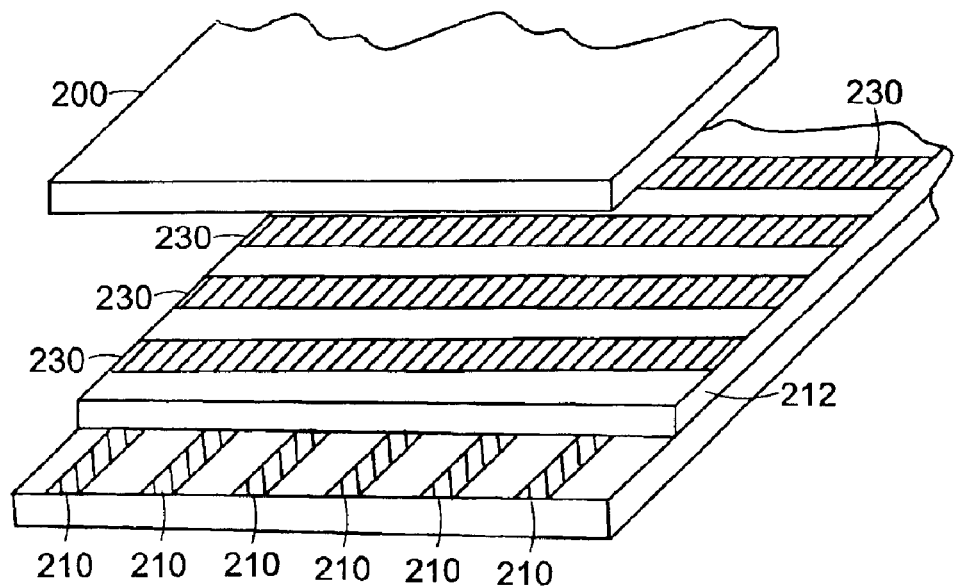
FIG. 15 is a perspective view of an embodiment of a control grid addressing structure.

Referring now to FIG. 15, a threshold may be introduced into an electrophoretic display cell by the introduction of a third electrode. One side of the cell is a continuous, transparent electrode 200 (anode). On the other side of the cell, the transparent electrode is patterned into a set of isolated column electrode strips 210. An insulator 212 covers the column electrodes 210, and an electrode layer on top of the insulator is divided into a set of isolated row electrode strips 230, which are oriented orthogonal to the column electrodes 210. The row electrodes 230 are patterned into a dense array of holes, or a grid, beneath which the exposed insulator 212 has been removed, forming a multiplicity of physical and potential wells.

A positively charged particle 50 is loaded into the potential wells by applying a positive potential (e.g. 30V) to all the column electrodes 210 while keeping the row electrodes 230 at a less positive potential (e.g. 15V) and the anode 200 at zero volts. The particle 50 may be a conformable capsule that situates itself into the physical wells of the control grid. The control grid itself may have a rectangular cross-section, or the grid structure may be triangular in profile. It can also be a different shape which encourages the microcapsules to situate in the grid, for example, hemispherical.

The anode 200 is then reset to a positive potential (e.g. 50V). The particle will remain in the potential wells due to the potential difference in the potential wells: this is called the Hold condition. To address a display element the potential on the column electrode associated with that element is reduced, e.g. by a factor of two, and the potential on the row electrode associated with that element is made equal to or greater than the potential on the column electrode. The particles in this element will then be transported by the electric field due to the positive voltage on the anode 200. The potential difference between row and column electrodes for the remaining display elements is now less than half of that in the normal Hold condition.

The geometry of the potential well structure and voltage levels are chosen such that this also constitutes a Hold condition, i.e., no particles will leave these other display elements and hence there will be no half-select problems. This addressing method can select and write any desired element in a matrix without affecting the pigment in any other display element. A control electrode device can be operated such that the anode electrode side of the cell is viewed.

The control grid may be manufactured through any of the processes known in the art, or by several novel processes described herein. That is, according to traditional practices, the control grid may be constructed with one or more steps of photolithography and subsequent etching, or the control grid may be fabricated with a mask and a "sandblasting" technique.

In another embodiment, the control grid is fabricated by an embossing technique on a plastic substrate. The grid electrodes may be deposited by vacuum deposition or sputtering, either before or after the embossing step. In another embodiment, the electrodes are printed onto the grid structure after it is formed, the electrodes consisting of some kind of printable conductive material which need not be clear (e.g. a metal or carbon-doped polymer, an intrinsically conducting polymer, etc.).

In a preferred embodiment, the control grid is fabricated with a series of printing steps. The grid structure is built up in a series of one or more printed layers after the cathode has been deposited, and the grid electrode is printed onto the grid structure. There may be additional insulator on top of the grid electrode, and there may be multiple grid electrodes separated by insulator in the grid structure. The grid electrode may not occupy the entire width of the grid structure, and may only occupy a central region of the structure, in order to stay within reproducible tolerances. In another embodiment, the control grid is fabricated by photoetching away a glass, such as a photostructural glass.

In an encapsulated electrophoretic image display, an electrophoretic suspension, such as the ones described previously, is placed inside discrete compartments that are dispersed in a polymer matrix. This resulting material is highly susceptible to an electric field across the thickness of the film. Such a field is normally applied using electrodes attached to either side of the material. However, as described above in connection with FIGS. 3A–3D, some display media may be addressed by writing electrostatic charge onto one side of the display material. The other side normally has a clear or opaque electrode. For example, a sheet of encapsulated electrophoretic display media can be addressed with a head providing DC voltages.

In another implementation, the encapsulated electrophoretic suspension can be printed onto an area of a conductive material such as a printed silver or graphite ink, aluminized mylar, or any other conductive surface. This surface which constitutes one electrode of the display can be set at ground or high voltage. An electrostatic head consisting of many electrodes can be passed over the capsules to addressing them. Alternatively, a stylus can be used to address the encapsulated electrophoretic suspension.

In another implementation, an electrostatic write head is passed over the surface of the material. This allows very high resolution addressing. Since encapsulated electrophoretic material can be placed on plastic, it is flexible. This allows the material to be passed through normal paper handling equipment. Such a system works much like a photocopier, but with no consumables. The sheet of display material passes through the machine and an electrostatic or electrophotographic head addresses the sheet of material.

In another implementation, electrical charge is built up on the surface of the encapsulated display material or on a dielectric sheet through frictional or triboelectric charging. The charge can built up using an electrode that is later removed. In another implementation, charge is built up on the surface of the encapsulated display by using a sheet of piezoelectric material.

Figure 16:
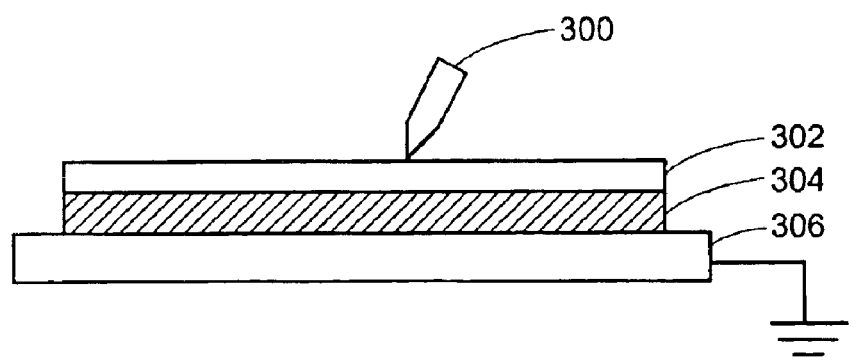
FIG. 16 is an embodiment of an electrophoretic display that can be addressed using a stylus.

FIG. 16 shows an electrostatically written display. Stylus 300 is connected to a positive or negative voltage. The head of the stylus 300 can be insulated to protect the user. Dielectric layer 302 can be, for example, a dielectric coating or a film of polymer. In other embodiments, dielectric layer 302 is not provided and the stylus 300 contacts the encapsulated electrophoretic display 304 directly. Substrate 306 is coated with a clear conductive coating such as ITO coated polyester. The conductive coating is connected to ground. The display 304 may be viewed from either side.

Microencapsulated displays offer a useful means of creating electronic displays, many of which can be coated or printed. There are many versions of microencapsulated displays, including microencapsulated electrophoretic displays. These displays can be made to be highly reflective, bistable, and low power.

To obtain high resolution displays, it is useful to use some external addressing means with the microencapsulated material. This invention describes useful combinations of addressing means with microencapsulated electrophoretic materials in order to obtain high resolution displays.

One method of addressing liquid crystal displays is the use of silicon-based thin film transistors to form an addressing backplane for the liquid crystal. For liquid crystal displays, these thin film transistors are typically deposited on glass, and are typically made from amorphous silicon or polysilicon. Other electronic circuits (such as drive electronics or logic) are sometimes integrated into the periphery of the display. An emerging field is the deposition of amorphous or polysilicon devices onto flexible substrates such as metal foils or plastic films.

The addressing electronic backplane could incorporate diodes as the nonlinear element, rather than transistors. Diode-based active matrix arrays have been demonstrated as being compatible with liquid crystal displays to form high resolution devices.

There are also examples of crystalline silicon transistors being used on glass substrates. Crystalline silicon possesses very high mobilities, and thus can be used to make high performance devices. Presently, the most straightforward way of constructing crystalline silicon devices is on a silicon wafer. For use in many types of liquid crystal displays, the crystalline silicon circuit is constructed on a silicon wafer, and then transferred to a glass substrate by a "liftoff" process. Alternatively, the silicon transistors can be formed on a silicon wafer, removed via a liftoff process, and then deposited on a flexible substrate such as plastic, metal foil, or paper. As another implementation, the silicon could be formed on a different substrate that is able to tolerate high temperatures (such as glass or metal foils), lifted off, and transferred to a flexible substrate. As yet another implementation, the silicon transistors are formed on a silicon wafer, which is then used in whole or in part as one of the substrates for the display.

The use of silicon-based circuits with liquid crystals is the basis of a large industry. Nevertheless, these display possess serious drawbacks. Liquid crystal displays are inefficient with light, so that most liquid crystal displays require some sort of backlighting. Reflective liquid crystal displays can be constructed, but are typically very dim, due to the presence of polarizers. Most liquid crystal devices require precise spacing of the cell gap, so that they are not very compatible with flexible substrates. Most liquid crystal displays require a "rubbing" process to align the liquid crystals, which is both difficult to control and has the potential for damaging the TFT array.

The combination of these thin film transistors with microencapsulated electrophoretic displays should be even more advantageous than with liquid crystal displays. Thin film transistor arrays similar to those used with liquid crystals could also be used with the microencapsulated display medium. As noted above, liquid crystal arrays typically requires a "rubbing" process to align the liquid crystals, which can cause either mechanical or static electrical damage to the transistor array. No such rubbing is needed for microencapsulated displays, improving yields and simplifying the construction process.

Microencapsulated electrophoretic displays can be highly reflective. This provides an advantage in high-resolution displays, as a backlight is not required for good visibility. Also, a high-resolution display can be built on opaque substrates, which opens up a range of new materials for the deposition of thin film transistor arrays.

Moreover, the encapsulated electrophoretic display is highly compatible with flexible substrates. This enables high-resolution TFT displays in which the transistors are deposited on flexible substrates like flexible glass, plastics, or metal foils. The flexible substrate used with any type of thin film transistor or other nonlinear element need not be a single sheet of glass, plastic, metal foil, though. Instead, it could be constructed of paper. Alternatively, it could be constructed of a woven material. Alternatively, it could be a composite or layered combination of these materials.

As in liquid crystal displays, external logic or drive circuitry can be built on the same substrate as the thin film transistor switches.

In another implementation, the addressing electronic backplane could incorporate diodes as the nonlinear element, rather than transistors.

In another implementation, it is possible to form transistors on a silicon wafer, dice the transistors, and place them in a large area array to form a large, TFT-addressed display medium. One example of this concept is to form mechanical impressions in the receiving substrate, and then cover the substrate with a slurry or other form of the transistors. With agitation, the transistors will fall into the impressions, where they can be bonded and incorporated into the device circuitry. The receiving substrate could be glass, plastic, or other nonconductive material. In this way, the economy of creating transistors using standard processing methods can be used to create large-area displays without the need for large area silicon processing equipment.

While the examples described here are listed using encapsulated electrophoretic displays, there are other particle-based display media which should also work as well, including encapsulated suspended particles and rotating ball displays.

Now referring to FIGS. 17–20, some display media include portions or components that do not contribute to the changing appearance of images displayed during operation of a display device. In particular, portions of a displayed image can have a fixed optical appearance. This effect can be described with reference to an illustrative display medium depicted in FIGS. 17A and 17B.

Figure 17A:
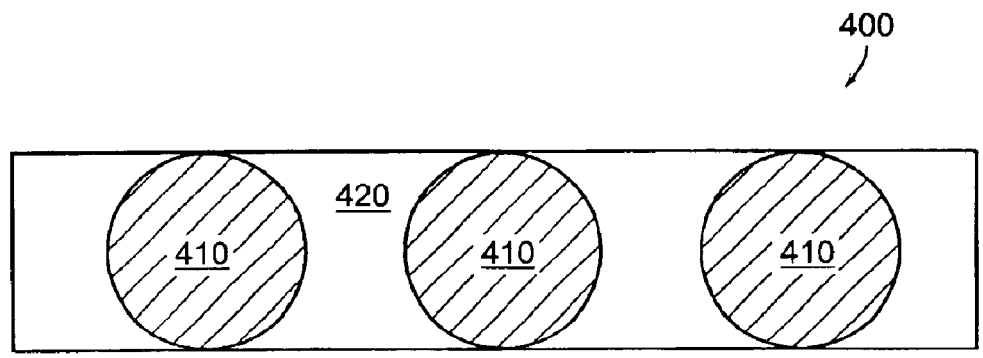
FIG. 17A is a cross-sectional view of an embodiment of an electrophoretic display medium.

FIG. 17A is a cross-sectional view of an embodiment of an electrophoretic display medium 400. The medium 400 includes electrophoretic material 410, for example, the above-described electrophoretic phase, and binder 420. The electrophoretic material may be directly encapsulated within voids in the binder 420 or reside within capsule membranes embedded in the binder 420.

The electrophoretic material 410 in the embodiment illustrated in FIG. 17A includes a suspending fluid and at least one electrophoretic particle. The suspending fluid has an optical property, and may be clear or dyed. The one or more particles may have an optical property that is different from that of the suspending fluid. The particles may include more than one type of particle. Different particle types may have different optical properties, different electrophoretic responses, and may be included in the same or different capsules. Further details regarding electrophoretic display materials are described at the end this Detailed Description of the Invention.

Figure 17B:
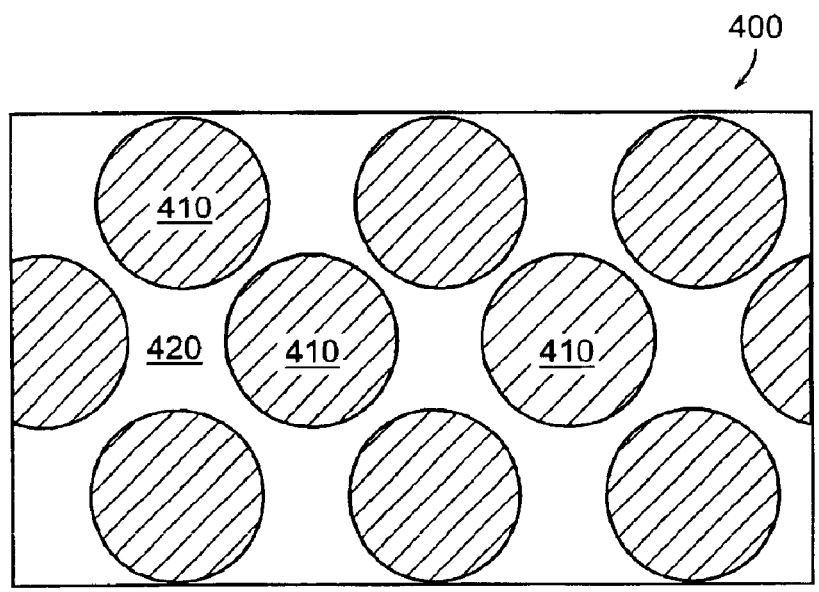
FIG. 17B is a planar-sectional view of an electrophoretic display medium corresponding to the embodiment shown in FIG. 17A.

FIG. 17B is a planar, two-dimensional projected view of the embodiment of the display medium 400, corresponding to FIG. 17A. As illustrated by FIG. 17B, a portion of the display surface has a fixed optical appearance, as seen by a user of the display. This portion of the display corresponds to regions that include only binder 420 in the viewed two-dimensional projection of the electrophoretic display medium 400. In contrast, viewed portions of the display that include electrophoretic material 410 can produce changing optical characteristics, for example, changing colors or reflectance. The display can thus present images to a user, though the images include a fixed portion, i.e., a fixed background.

More generally, binder, capsule membranes and other materials with a fixed optical state, and which extend through the viewed thickness of a display medium, may contribute to a fixed portion of an image presented by a display. The fixed optical state portion of the display typically dilutes the image quality produced by the variable optical state portion.

The optically fixed portions of a display may be transparent, translucent or opaque. The fixed portions may have an optical property that is predetermined, that is, selected during design or manufacturing of the display. The characteristic may be modified by, for example, changing a characteristic of the optically fixed components of a display or adding additional structures, such as additional layers, to the display structure. The predetermined property may be, for example, a reflectance, a transmittance, a brightness or a color.

The optically fixed components of a display that can be selected to have a particular characteristic are any of the components that can be observed, at least in part, by a viewer of the display. These include, for example, a top (light transmitting) electrode, a binder material, or a bottom electrode seen through the binder. The materials from which these structures are formed can be selected for its optical properties. Alternatively, materials, for example, in atomic, molecular or particulate form, may be added to a structure to modify its optical properties.

Added structures can include, for example, a layer positioned at various levels of a display element sandwich. In the following description, various added structures, materials added to existing structures, or modified existing structures, are referred to as "optical biasing elements". These materials and structures may also be referred to as "background" components because they contribute to the optically fixed portion of a display.

If the fixed portion of a display is not completely black, the fixed portion will limit the degree of black (i.e. the dark state) that the display can present. If the fixed portion is not completely white, the degree of white will be limited. Thus, the contrast range of the display may also be limited by the fixed portion.

Typically, the reflectance and contrast ratio of a display are the optical properties of most interest. For example, the white reflectance is a ratio of the white state of the display to a white state of a standard, the standard representing 100% reflectance. The contrast ratio is generally defined as the ratio of the white reflectance to the dark reflectance. These properties control the visibility and legibility of a display. Though ideal values of the optical characteristics vary for different applications, one generally prefers a white reflectance and a contrast ratio that are as high as possible.

When designing an electrophoretic display element, one can make tradeoffs in the selection of optical characteristics. For example, increases in the dye concentration of a fluid, in a suspending fluid and particle-based electrophoretic material, can serve to reduce both the white and dark reflectance of the variable portions of a display. An increase in the particle concentration in such an electrophoretic material can increase both the white and dark reflectances. Optical properties can also be changed by changing the thickness of the electrophoretic display medium 400, for example, by reducing the capsule size.

The white reflectance, dark reflectance and contrast ratio of a display can be estimated with the below equations. The white reflectance of a display may be expressed as:

$$R_W = (R_{MC-W})(A_S) + (R_{BKGND})(1 - A_S) \quad \text{Eq. 1}$$

The dark/black reflectance as:

$$R_D = (R_{MC-D})(A_S) + (R_{BKGND})(1 - A_S) \quad \text{Eq. 2}$$

The contrast ratio as:

$$C_R = \frac{R_W}{R_D} = \frac{(R_{MC-W})(A_S) + (R_{BKGND})(1 - A_S)}{(R_{MC-D})(A_S) + (R_{BKGND})(1 - A_S)} \quad \text{Eq. 3}$$

which may be expressed as:

$$C_R = \frac{R_W}{R_D} = \frac{(R_{MC-W}) + (R_{BKGND})(1 - A_S)/(A_S)}{(R_{MC-D}) + (R_{BKGND})(1 - A_S)/(A_S)} \quad \text{Eq. 4}$$

where:

$R_W$ is the reflectance (in percent) of a display having a white appearance, as a percentage of the reflectance of a standard white material that is taken as having 100% reflectance;

$R_D$ is the reflectance (in percent) of a display having a black appearance, as a percentage of the reflectance of a standard white material that is taken as having 100% reflectance;

$R_{MC-W}$ is the reflectance (in percent) of a unit area of capsules having a white appearance, as a percentage of the reflectance of a standard white material that is taken as having 100% reflectance;

$R_{MC-D}$ is the reflectance (in percent) of a unit area of capsules having a black appearance, as a percentage of the reflectance of a standard white material that is taken as having 100% reflectance;

$R_{BKGND}$ is the reflectance (in percent) of a unit area of the background of the display, as a percentage of the reflectance of a standard white material that is taken as having 100% reflectance;

$A_{SWITCHABLE}$ or $A_S$ is the area, as a percentage of the total surface area of the display, of the portion of a display that can be set to display a first optical property or a second optical property, for example white and black. Hence, the value $(1 - A_{SWITCHABLE})$ or $(1 - A_S)$ denotes the percentage of the total area of the display that cannot be changed in appearance, i.e., the fixed viewable portion of the display; and $C_R$ is the contrast ratio, or $R_W/R_D$.

Equation 4, for example, illustrates the effect on the contrast ratio of changes in the various reflectances when the area of the capsules as a percentage of the total display area, or equivalently, the ratio $(1 - A_S)/(A_S)$, is held constant. One can also note the effect on the contrast ratio of changes in the area of the capsules as a percentage of the total display area when the various reflectances are held constant.

If, for example, $A_S$, $R_{MC-W}$ and $R_{MC-D}$ are held constant, with $R_{MC-W} > R_{MC-D}$, an increase in $R_{BKGND}$ will decrease the contrast ratio $C_R$, while a decrease in $R_{BKGND}$ will increase $C_R$. This result is obtained because the addition of a fixed amount of reflectance through an increase in $R_{BKGND}$ is a smaller increase proportionately to the larger quantity $R_{MC-W}$ than it is to the smaller quantity $R_{MC-D}$. Increasing $R_{BKGND}$, however, will increase the overall reflectance of either display state, causing the display to appear brighter, with a smaller contrast ratio. Conversely, a decrease of $R_{BKGND}$ will cause the display to appear darker, with greater contrast ratio.

Alternatively, the total reflectance, as well as the spectral distribution of the reflectance, of the background may be changed, for example, by changing the color or tone of the background. This would alter the appearance of the display with regard to one or more of the brightness, the contrast and the color or tone of the various display states. The illustrative embodiment of FIGS. 17A and 17B has been presented with regard to a display that comprises capsules that offer only a black appearance and a white appearance. As described elsewhere in this Detailed Description, other embodiments, such as displays having capsules comprising multiple colored particles, colored suspending fluids and colored electrodes can be provided according to the principles of the invention. The use of a biasing element as described herein with such other embodiments can affect many of the optical properties of such displays.

The above-shown model equations illustrate the potential to control the optical characteristics of a display by selecting the optical characteristics of an optically fixed portion of the display. An optical biasing element can be added to, for example, an electrophoretic display element to achieve this control of the fixed portion of the display element. An optical biasing element can include various materials, and have various locations in the display element structure, as illustrated in the embodiments described with reference to FIGS. 18–20.

Figure 18A:
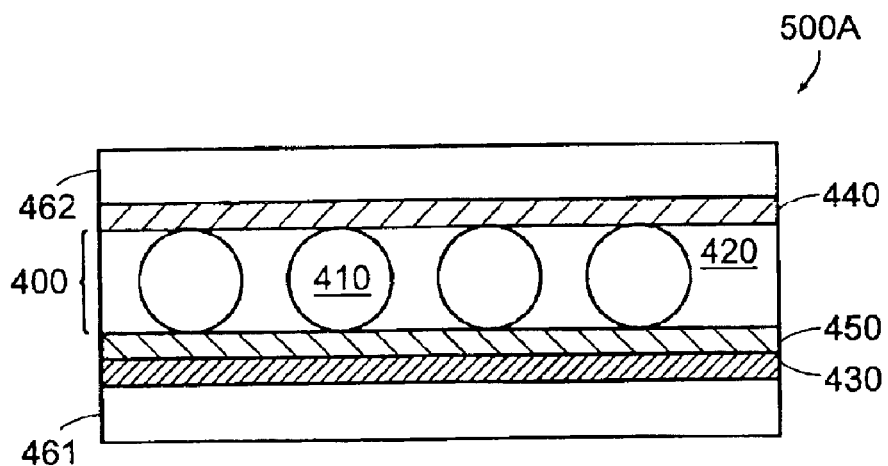
FIGS. 18A–18C are cross-sectional views of embodiments of an electrophoretic display element having an optical biasing element at various locations.

Various embodiments of a display element that include an optical biasing layer are described with reference to FIGS. 18A, 18B and 18C. FIG. 18A is a cross-sectional view of a display element 500A that includes a top substrate 462 and a bottom substrate 461. The bottom substrate 461 may include, for example, a rigid layer, such as glass, or a flexible sheet, such as polyimide. The bottom substrate 461 may be part of an electrical backplane of a display.

The display element 500A includes an electrophoretic display medium 400, which includes electrophoretic material 410 and binder 420. The electrophoretic material may be directly encapsulated within voids the binder 420 or reside within capsule membranes embedded in the binder 420. The display element 500A also includes, and is addressed via, a top electrode 440 and a bottom electrode 430. The top electrode and the top substrate are light transmissive to permit observation of the electrophoretic display medium 400.

The display element 500A includes an optical biasing element 450, located between the electrophoretic display medium 400 and the bottom electrode 430. In the present embodiment, the optical biasing element 450 is a sheet or layer of material that is selected for its optical characteristics, as described above.

The optical biasing element 450 may be fabricated, for example, by depositing, coating, printing or laminating material adjacent to the bottom electrode or the bottom substrate. A biasing element may include a thermoplastic sheet or an adhesive layer that may help to laminate layers of a display element.

Figure 18B:
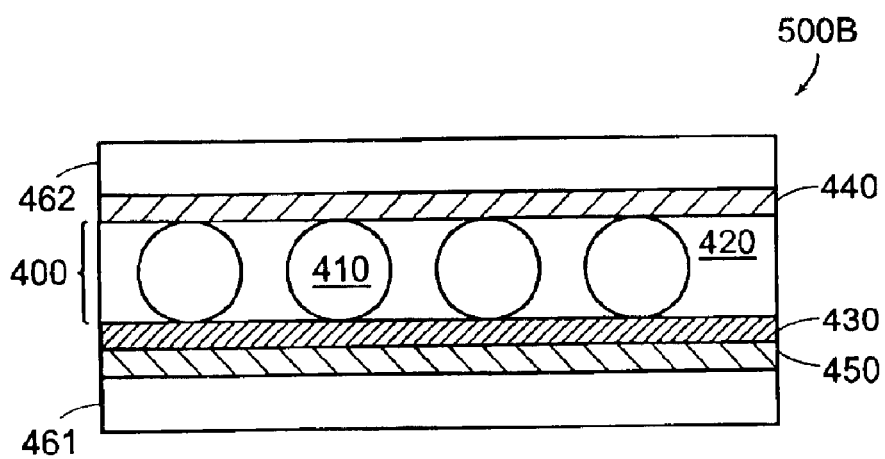
Figure 18C:
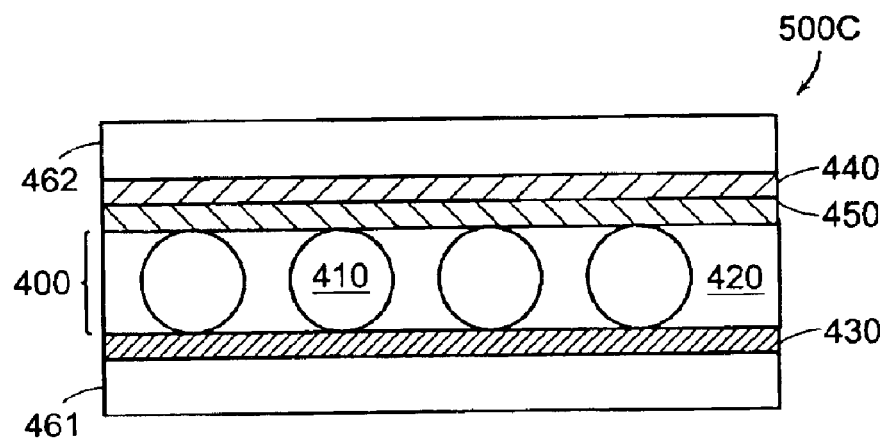

As illustrated in FIG. 18B, a display element 500B includes an optical biasing element 450 that is located between the bottom substrate 461 and the bottom electrode 430. As illustrated in FIG. 18C, a display element 500C includes an optical biasing element 450 located between the top substrate 462 and the electrophoretic display medium 400.

Other embodiments include an optical biasing element at other locations, with the requirement that at least a portion of the optical biasing element be viewable by an observer of the display. Further, the optical biasing element should be sufficiently transmissive to light to permit viewing of the electrophoretic material, if the optical biasing element overlays the electrophoretic material. If the biasing element lies beneath the electrophoretic display medium 400, the element may be transmissive or opaque.

Figure 19A:
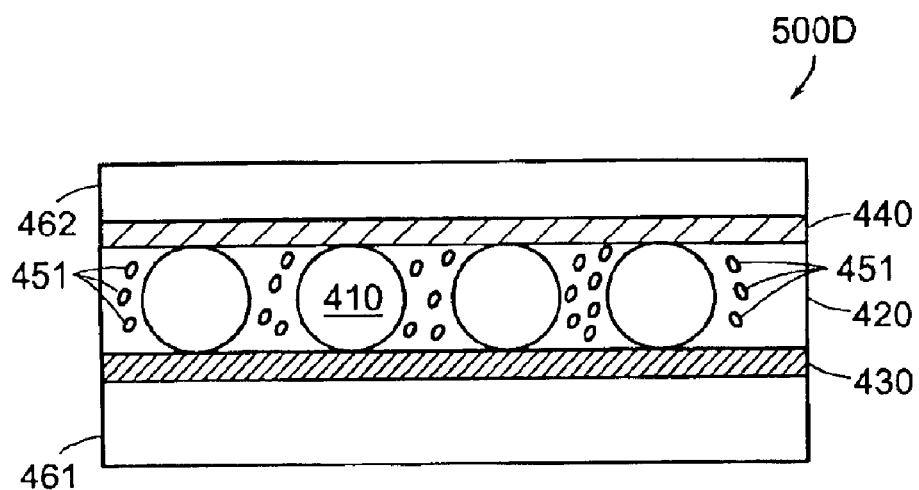
FIGS. 19A and 19B are cross-sectional views of embodiments of an electrophoretic display element having an optical biasing element embedded in a binder.
Figure 19B:
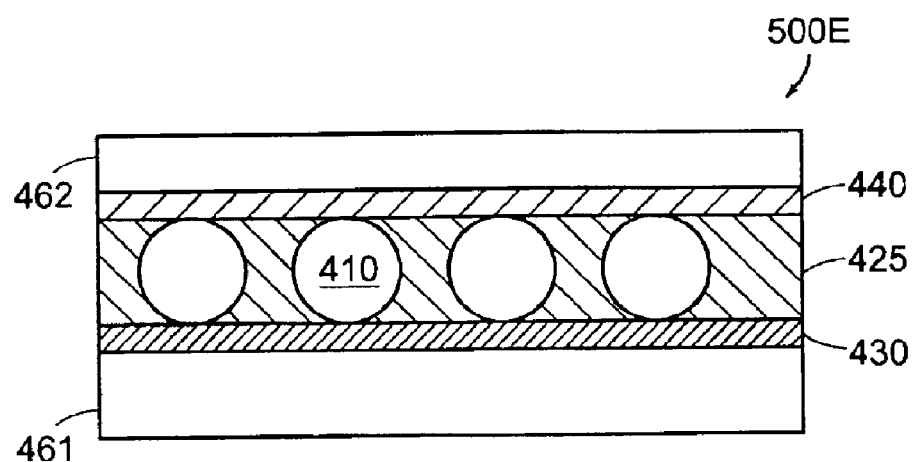

Referring to FIGS. 19 and 20, other embodiments incorporate an optical biasing element within other display element components, rather than as a separate layer or other distinctly separate structure. FIGS. 19A and 19B are cross-sectional views of embodiments that incorporate, or embed, an optical biasing element in a binder material.

FIG. 19A illustrates an embodiment of a display element 500D with an electrophoretic display medium layer that includes binder 420. Embedded in the binder is an optical biasing element that includes particles 451. During manufacturing, for example, particles 451 may be added to a binder in its liquid state, prior to mixing with an encapsulated electrophoretic material.

The particles 451 are selected for their optical properties. The particles 451 may include, for example, carbon black or pigment. The pigment may be, for example, white pigments such as titanium dioxide, barium sulfate and barium titanate. The particles may include one or more metals, for example, noble metals such as silver, gold and palladium.

FIG. 19B illustrates an embodiment of a display element 500E with an electrophoretic display medium layer that includes an optically modified binder 425. Embedded in the binder is an optical biasing element that includes atoms or molecules. The optical biasing element is selected for its ability to modify an optical characteristic of the binder.

Figure 20A:
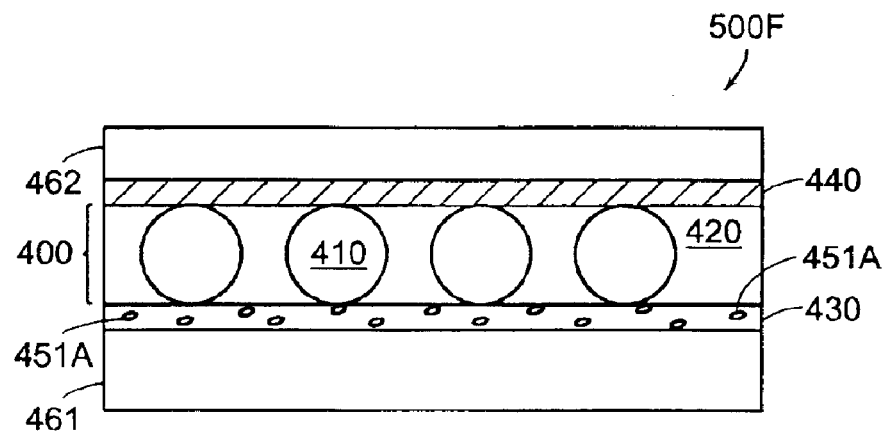
FIGS. 20A and 20B are cross-sectional views of embodiments of an electrophoretic display element having an optical biasing element embedded in an electrode.
Figure 20B:
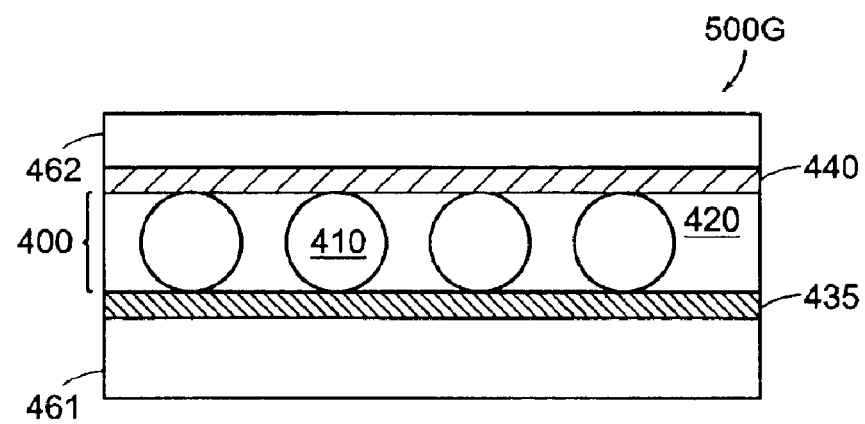

FIGS. 20A and 20B illustrate embodiments in which an optical biasing element is incorporated into an electrode layer. FIG. 20a is a cross-sectional view of an embodiment of a display element 500F that includes a bottom electrode 430. An optical biasing element is embedded in the bottom electrode 430. The optical biasing element includes particles 451A that are selected for an optical characteristic.

The particles may include, for example, pigment particles such as titanium dioxide, barium sulfate and barium titanate particles. The particles may be incorporated into an electrode formed from a polymeric material. For example, carbon-containing particles may be incorporated in a polymeric carrier to produce a black appearing electrode.

FIG. 20B is a cross section of an embodiment of a display element 500G. A molecular, or atomic optical biasing element is incorporated into a bottom electrode to provide an optically modified electrode 435.

In other embodiments, an optical biasing element is coated on top of an electrode. For example, metallic particles such as silver, gold or palladium may be coated on the electrode. Alternatively, an electrode material may be selected to provide both necessary conductivity for the electrode and to provide an optical characteristic. Thus, the electrode may be both an electrode and an optical biasing element. Similarly, other components of a display element may be formed of materials to enable such a dual function.

Now referring to FIGS. 21–25, according to principles of the invention, some displays include one or more layers that can enhance the brightness of display images. Throughout the views of FIGS. 21–25, arrows represent various rays of light.

In particular, a refractive layer or film with a relatively lower refractive index (the "low-index refractive layer"), in combination with a material portion having a higher index of refraction and disposed between reflective particles of the display medium and the low-index refractive layer, can reduce the loss of light associated with internal reflection. The material portion having a higher index of refraction can include a portion of an encapsulated display medium, such as a capsule membrane, a cell structure or a binder material. In embodiments of non-encapsulated displays, the material portion with a higher refractive index can include a barrier structure, or separation structure enclosing a display medium (e.g. a fluid suspended with particles). General principles of light loss associated with internal reflection are next described with reference to an illustrative display depicted in FIG. 21.

The term "pixel," as used herein, refers to a portion of the display medium that includes, for example, a portion of one cell or one capsule, a complete cell or capsule, or more than one cell or capsule. A pixel can be defined, for example, by addressing electrodes positioned adjacent to the bottom surface of the display medium.

The term "optical stack," as used herein, refers to the materials through which light must pass to scatter from the particles (and through which scattered light must pass to be observed by the display user).

Figure 21:
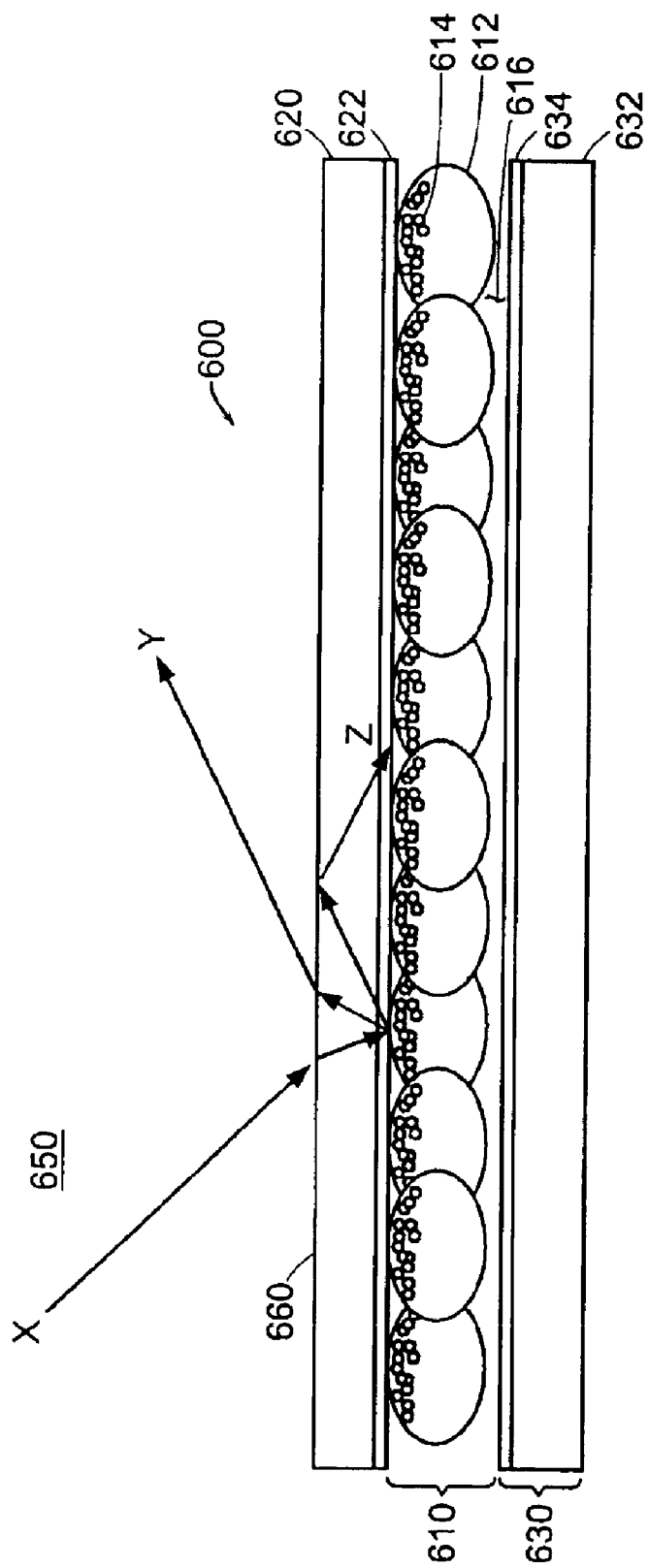
FIG. 21 is a cross-sectional view of an embodiment of an electrophoretic display.

FIG. 21 shows a cross-sectional view of an embodiment of an electrophoretic display 600. The display includes an electrophoretic display medium 610, which includes capsules 612, electrophoretic particles 614, and binder 616. The display further includes a front layer 620 (e.g., a window or window layer) that can be in contact with a transparent conductor 622. The window 620 can be, for example, glass or plastic. The display can further include backplane electronics 630, which include a substrate 632 and an electrode 634.

Incident light from the ambient environment 650 (e.g. air) following, for example, path X is refracted when it passes through the front ambient environment-window interface 660. The light passes into the electrophoretic display medium 610, and undergoes multiple scattering off, for example, particles 614 inside the capsules 612.

The light reflects off the particles in a Lambertian (or near Lambertian) distribution; that is, the intensity I of light varies with θ, the angle from the normal, according to approximately:

$$I(\theta)=I(0)\cos\theta,$$

where I(0) is the intensity of light reflecting normal to the surface of the display. Light rays that return close to the normal to the display, at an angle from the normal θ<$\theta_c$, where $\theta_c$ is the critical angle of the ambient environment-window interface, return through the capsule, the binder, the front window, and finally out of the display to the observer's eye, e.g., light path Y.

The light that reflects from the particles at an angle larger than $\theta_c$, however, is reflected internally, e.g., along path Z, as the light attempts to enter a matter of a lower refractive index, for example, at the interface between the window 620 and the ambient environment 650. The interface between the window 620 and the ambient environment 650 is sometimes referred to as the air-window interface. For monochrome displays (with and without grayscale capability), this light has a chance at being recycled only if it impinges on a neighboring pixel that is switched to a light state (e.g., white or a light shade of gray). If the internally reflected light impinges on a pixel showing a dark state, it is absorbed. Depending upon the properties of the optical stack, optical losses due to this mechanism may reduce display brightness by as much as 50% or more.

For a color filter based display, light that undergoes internal reflection off the air-window interface typically also has a smaller probability of being effectively recycled. For example, for a color display architecture that includes red, green, and blue filters, incident light is filtered before the first opportunity for internal reflection. Internally reflected light that originates from, for example, a red pixel has a chance of meaningful recycling only if it returns to a pixel that is red or reflects light close to red on the spectrum, on its second pass at being reflected off a reflective particle. If red light internally reflects back to a green or blue region, the light will be strongly absorbed and any potential recycling effect is effectively negated.

To reduce light loss, as described below in more detail, preferred embodiments include the low-index refractive film or layer in a microencapsulated electrophoretic display optical stack (the terms "film" and "layer" are herein used interchangeably). The low-index refractive layer and a material portion (in these preferred embodiments, a portion of an encapsulated display medium) together reduce light losses associated with the internal reflection problem. In one embodiment, the low-index refractive layer is disposed between the encapsulated electrophoretic display medium and the front window of a display.

Figure 22A:
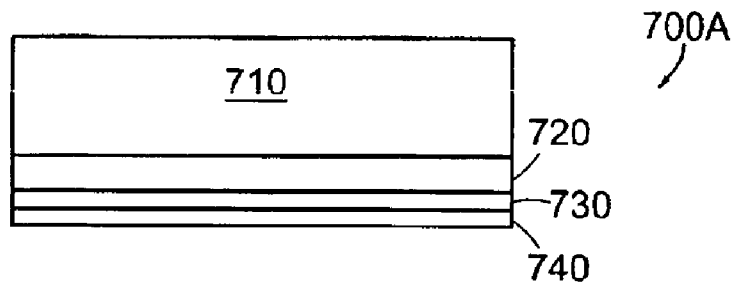
FIGS. 22A–C are cross-sectional views of embodiments of upper layers of electrophoretic displays including a low-index layer.
Figure 22B:
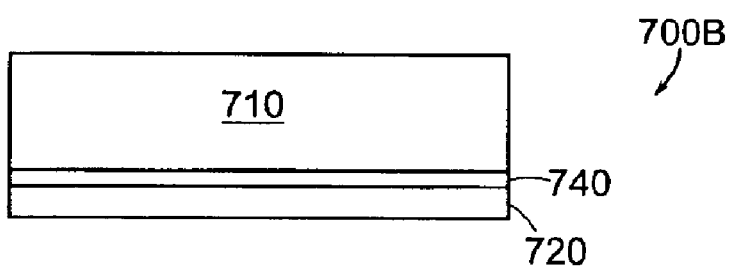
Figure 22C:
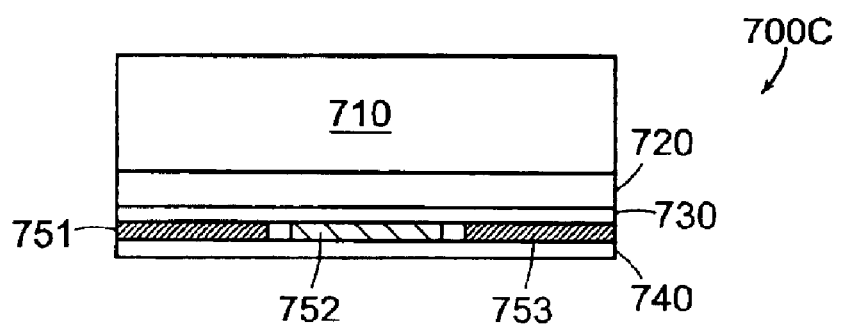
Figure 23:
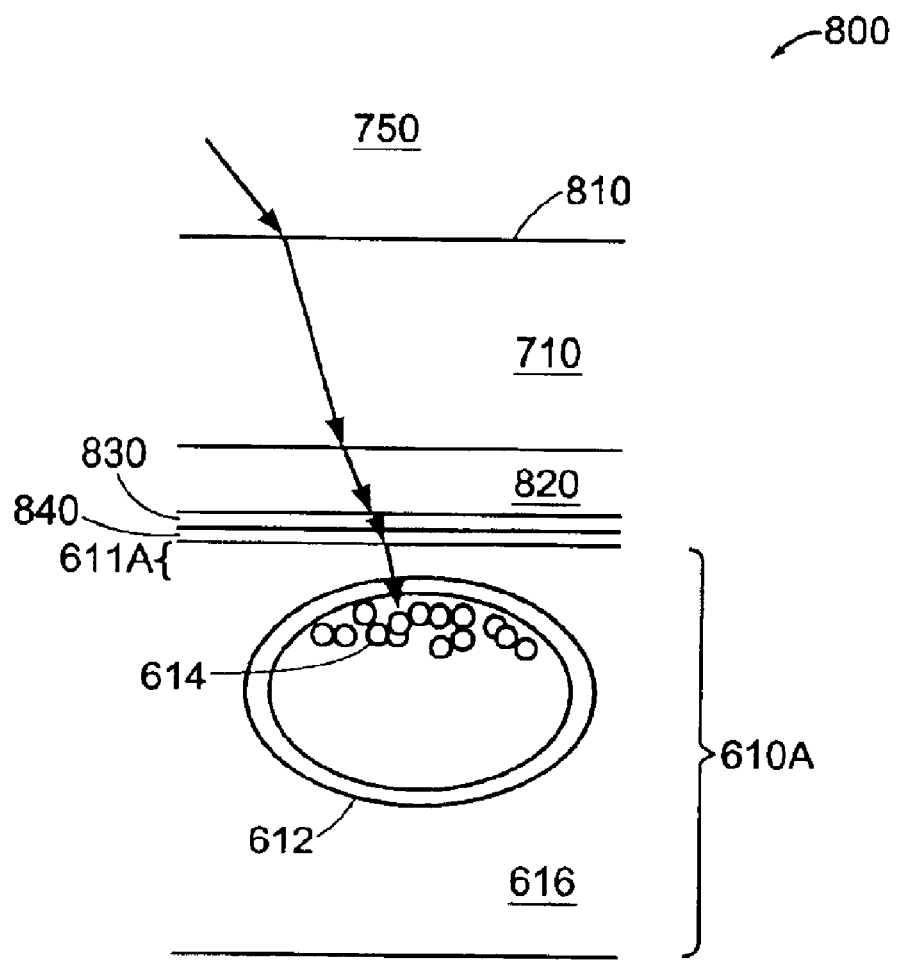
FIG. 23 is a cross-sectional view illustrating a path of incident light into an embodiment of an electrophoretic display including a low-index layer.
Figure 25:
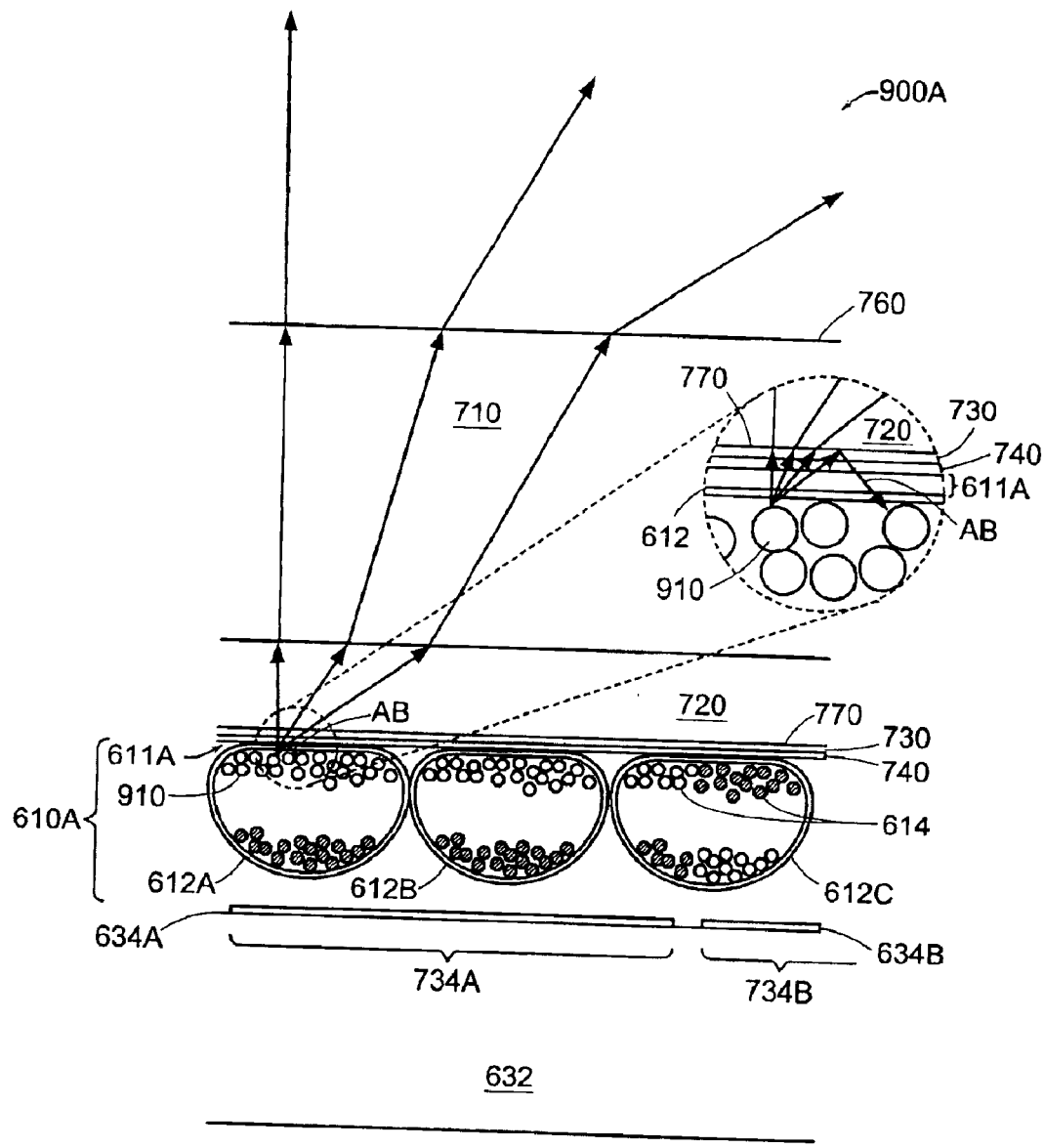
FIG. 25 is a cross-sectional view of an embodiment of an electrophoretic display with a low-index layer, which illustrates paths of light out of the display.

Referring to FIGS. 22A–22C, various embodiments of some upper layers (or an optical stack portion) of displays that include reflective particles and the low-index refractive layer are now described. FIG. 22A is a cross-sectional view of an embodiment of the upper layers of a display 700A. The display 700A includes a front window 710, a low-index refractive layer 720, and can include a capping layer 730 and a transparent conductor 740. The transparent conductor 740 may be adjacent to a reflective display medium layer (embodiments of a reflective display medium layer are shown in FIGS. 23 and 25).

In some implementations, the window 710 is made of glass or plastic. The window 710 preferably has a thickness in a range from about 400 to about 1100 μm for glass and from about 50 to about 500 μm for plastic. The window 710 can also include, for example, ultra-thin glass material having a thickness from about 10 μm to about 300 μm.

FIG. 22B is a cross-sectional view of another embodiment of some upper layers of a display 700B. The display 700B includes the front window 710, the transparent conductor 740 and the low-index refractive layer 720. The low-index refractive layer 720 preferably has a thickness in a range of approximately 200 nm to approximately 100 μm.

FIG. 22C is a cross-sectional view of another embodiment of the upper layers of a display 700C. The display 700C includes the front window 710, the low-index refractive layer 720, the capping layer 730, color filter resist materials (for example, red material 751, green material 752 and blue material 753), and the transparent conductor 740. It should be recognized that other colors of color filter resist materials such as, for example, cyan, magenta and/or yellow may be used.

The low-index refractive layer 720 may have a refractive index that is lower than the refractive index of the window 710 (a typical refractive index value for the window 710 is 1.52, and a typical refractive index value for the low-index refractive layer 720 may be, for example, 1.22). The low-index refractive layer 720 can be chosen from any material with suitably low index of refraction, but it is preferable for the index of refraction to be as close as possible to that of the ambient environment (e.g., air, argon) that normally surrounds the display.

Aerogels and other nanoporous materials (e.g., materials having pores of approximately 5 nm size or less) are especially useful as low-index refractive layer 720 where the ambient environment has an index of refraction close to that of air (i.e. ~1.0), since their index of refraction typically ranges from 1.01 to 1.10. Low-index refractive layer 720 can also include foams or other highly porous structures, and composites that include at least one low index material.

Some examples of materials useful for low-index refractive layer include nanoporous silica coatings such as NANOGLASS (Honeywell Corporation, Sunnyvale, Calif.) with an index of refraction ranging from roughly 1.1 to 1.3, various other spin-on-glass materials such as ACCUGLASS (Honeywell Corporation, Sunnyvale, Calif.) with an index of refraction ranging from roughly 1.2–1.5 (typically employed in semiconductor wafer processing), sodium aluminum fluoride (e.g. cryolite) with an index of refraction of 1.33 (typically employed as an anti-reflective coating for lenses). Other useful materials will be apparent to one having skill in the art. A low-index composite film, for example, a multi-layer stack built using more than one optical material, can also be used, according to principles of the invention.

These materials can be composed of, for example, silica, alumina, aluminosilicate, graphite, carbon, ruthenium dioxide, colloidal gold, metal-oxide doped silica and alumina, niobia, titania, metal-doped carbon, vanadium pentoxide, zirconia, or other materials known to those skilled in the art.

In various embodiments, the transmission spectra of a low-index refractive layer 720 including a nanoporous material can be selected such that the material substantially absorbs select wavelengths of electromagnetic radiation. For example, the low-index refractive layer 720 can be designed to absorb in the UV wavelengths (for example, wavelengths less than about 390 nm) to, for example, protect the electro-optic material from UV damage.

In further embodiments, the nanoporous material can be designed or processed in such a way that the material exhibits photoluminesence (i.e., absorbed radiative energy is emitted in the visible wavelengths). For example, the material can be doped with semiconducting, conducting, or dielectric nanoparticles or exposed to other agents during processing to impart specific photoluminesent properties to the material. The photoluminescence of the low-index refractive layer 720 can be used to enhance the optics of the display in particular lighting environments.

The low-index refractive layer 720 can also consist of a vacuum or gas-filled gap defined by its neighboring layers. Spacers can be positioned in the gap for structural support between the neighboring layers and/or to control the width of the gap. Such a gap can provide a desirable index of refraction.

FIG. 23 shows an embodiment of a reflective display 800. The display 800 includes a reflective encapsulated display medium 610A, thin-film layers 830, 840 (such as capping layer 730 and transparent conductor 740), a low-index film 820, and a window 710 having an interface 810 with an ambient air 750. The reflective encapsulated display medium 610A includes a material portion 611A that is disposed between the reflective particles 614 and the low index-film 820.

Light from the ambient environment 750 and falling upon the reflective display undergoes refraction, described by Snell's law, as it passes through the front air-window interface 810 into the window 710. As the light passes into the low-index film 820, it undergoes a second refraction away from the normal. Preferably, the thickness of the low-index film 820 is selected to be larger than the longest wavelength of visible light incident upon the display. For example, the low-index film 820 can have a thickness of 2 $\mu$m or more.

The light then passes through one or more thin films, which can include a capping layer 830, such as silicon dioxide, silicon monoxide, or, more generally, $SiO_x$, and a transparent conductor 840, such as indium tin oxide or conductive polymer. These films 830 are thin (preferably having a thickness in a range of approximately 100 nm to approximately 200 nm) so the light ray does not refract substantially upon passing through the films 830. Preferably, these thin films are also as transparent as possible.

The light ray then passes through the material portion 611A of the display medium 610A before striking the particles 614. The material portion 611A can include portions of encapsulating structure, for example, polymeric materials, of the display medium 610A. The portion material 611A can be, for example, several micrometers thick, and can refract the incident rays back toward the normal before the rays impinge on the particles 614. In embodiments of non-encapsulated displays, the material portion 611A can include portions of a barrier structure, or separation structure surrounding a display medium (e.g. a fluid suspended with particles).

Figure 24:
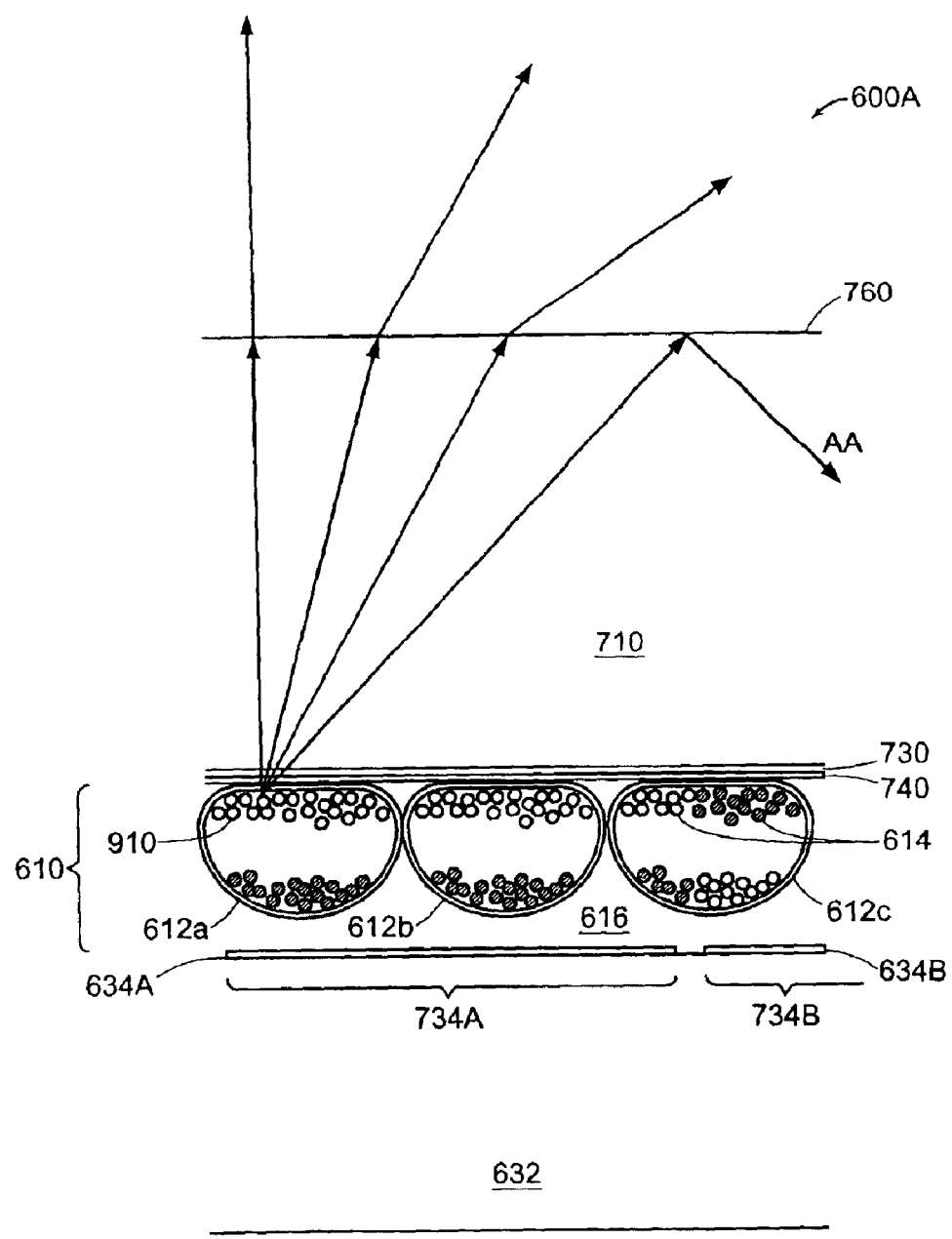
FIG. 24 is a cross-sectional view of an embodiment of an electrophoretic display without a low-index layer, which illustrates paths of light out of the display.

FIGS. 24 and 25 illustrate the passage of light after scattering from the reflective particles 614 in embodiments that include features of the above-described displays 600, 700A, 700B, 700C, 800. FIG. 24 shows an embodiment of a display 600A that does not include a low-index film, while FIG. 25 shows an embodiment of a display 900A that does include a low-index film 720.

Referring to FIG. 24, in the display 600A without a low-index refractive layer, light incident on the display can experience the first refraction at the ambient environment-window interface 760 and then pass with little or no refraction through the thin-film transparent conductor 740. If the refractive index of the front window 710 is roughly equal to that of the binder 616 and capsules 612A, 612B, 612C, the light ray undergoes only a slight shift in angle due to refraction at the display medium 610 interface.

Referring to FIG. 25, the presence of the low-index refractive layer 720 in the display 900A has only a small effect on the incident path of a ray of light prior to the ray striking the reflective particles 614. Ambient light refracts away from the normal when it passes from the window 710 into the low-index refractive layer 720, but almost returns to its original path when it passes into the display material 610A. Thus, for a highly transparent low-index refractive layer 720, light typically reaches the display material 610A with an angular intensity distribution close to that found for an optical stack that does not include the low-index refractive layer 720.

The effect of the low-index refractive layer 720 in cooperation with material disposed between the low-index refractive layer 720 and the reflecting particles 614 can be greater, however, on the paths of rays of light departing from the particles 614. The paths of reflected light are illustrated by arrows in FIGS. 24 and 25 for optical stacks, respectively, without and with the low-index refractive layer 720.

Referring again to FIG. 24, two electrodes 634A and 634B are shown to address different portions of the display medium 610, effecting two pixels 734A and 734B, respectively. Specifically, for example, the electrode 634A may address capsules 612A and 612B, and a portion of capsule 612C; the electrode 634B may address the remaining portion of capsule 612C. As shown in FIG. 24, pixels 734A and 734B may exhibit differing optical result. In a monochromatic display, pixel 734A may be exhibiting a white state while the pixel 734B exhibits a black state. In a multichromatic display, the two pixels 734A and 734B may be exhibiting two different colors such as red and blue, respectively.

In the embodiment shown in FIG. 24, the optical stack does not include the low-index refractive layer 720, and reflected light rays travel an essentially undisturbed path from the Lambertian reflector portion (i.e. reflecting particles 910), and undergo internal reflection (e.g., light path AA) against the front air-window interface 760 (for example, hundreds of micrometers distant from the reflective particles 910. As illustrated, the light ray reflected by reflective particles 910 in the capsule 612A and following the light path AA, is internally reflected onto a pixel other than the originating pixel 734A. The internally reflected light may travel to nearby pixels where it is either absorbed or re-reflected (which can produce, e.g., undesirable optical cross-talk), or the light can travel out of the display edge.

Referring to FIG. 25, in an encapsulated display 900A, similar to FIG. 24, two electrodes 634A and 634B address different portions of the display medium 610A, effecting two pixels 734A and 734B, respectively. The optical stack of the display 900A includes the low-index refractive layer 720 and the material portion 611A of the display medium 610A that is disposed between reflective particles 614 and the low-index refractive layer 720. The display materials that lie between the low index refractive layer 720 and the reflective particles 614 includes the material portion 611A of the encapsulated display medium 610A.

The material portion 611A of an encapsulated display may include, for example, capsule or cell material, binder material, and fluid material. In alternative implementations of a display according to principles of the invention, additional layers of material can be disposed between the material portion 611A and the low-index film 720, such as the thin-film coating 730 and transparent conductor 740. In embodiments of non-encapsulated displays, the material portion 611A can include portions of a barrier structure, a wall structure, or separation structure surrounding a display medium (e.g. a fluid suspended with particles).

Still referring to FIG. 25, light undergoes several refraction events as it exits the display. Exiting light may also undergo internal reflection, e.g., at the interface 770 between the thin film coating 730 and the low-index refractive layer 720. According to principles of the invention, most scattered light that internally reflects within the optical stack reflects at the interface between the low-index refractive layer 720 and the display materials that lie between the low index refractive layer 720 and the reflective particles 614.

The interface 770 between the thin-film coating 730 and the low-index refractive layer 720 is preferably spaced at most a few micrometers (e.g., less than 2 μm) from the Lambertian reflector portion (e.g. reflecting particles 910). The combined thickness of the coating 730, the transparent conductor 740 and the rest of the material portion 611A can be selected to return most, e.g., more than 50%, of the internally reflected light back to the same pixel (i.e., the pixel from which the light scattered). For example, the light ray reflected by reflective particles 910 in the capsule 612A and following the light path AB, is internally reflected onto part of the originating pixel 734A, and not to the adjacent pixel 734B. In effect, the proximity of the interface 770 between the low-index refractive layer 720 and the material portion 611A effectively forces internal reflection to take place closer to the reflective particle 614 where the original reflection takes place. Understandably, a larger pixel can permit a greater thickness of these materials.

The thickness of the transparent conductor 740, for example, is approximately 0.1 μm, to provide a balance between desirable conductivity and transparency. Thus, desirable internal reflection can be dominated by the material portion 611A of the encapsulated display medium 610A that is disposed between the reflective particles 614 and the low-index refractive layer 720. In some preferred implementations, the thickness of the material portion 611A is a few times a wavelength of light being scattered by the particles 614, or greater.

In some preferred implementations, however, the distance between the Lambertian reflector portion (particles 614) and the internal reflection interface is smaller than the longest wavelength of visible light to pass through the display.

With proper selection of indices of refraction and material thicknesses, most of the light internally reflected within the material portion 611A can be reflected back to the same pixel 734A (e.g. light path AB). The pixel size, for example, can be chosen to be several times as large as the distance between the Lambertian reflector portion and the internal reflection interface.

For example, pixels having a greatest dimension of 100 μm to 300 μm, or smaller, can recapture scattered light that is internally reflected within the material portion 611A. Thus, encapsulated electrophoretic displays and optical stacks, according to principles of the invention, can provide highly effective light recycling compared to at least some traditional display designs.

In implementations with desirable pixel cross-talk properties, the display materials that lie between the low index refractive layer 720 and the reflective particles 614 have a thickness that causes most light that is scattered and internally reflected to return to the same pixel (i.e., the pixel from which it was scattered.) The thickness can be chosen through use of geometrical considerations regarding the range of scattering angles that lead to internal reflection, the size and shape of a pixel, and the location of a scattering particle within the pixel. As described above, selection of a thickness of the display materials that lie between the low index film 720 and the reflective particles 614 that is much less than a pixel width can support the return to the same pixel of most scattered and internally reflected light.

Optical stacks of the invention generally do not degrade the "paper-like" optical performance of the Lambertian display. The output light still has an angular intensity distribution substantially as found for traditional stack designs, but the intensity magnitude is typically greater due to more efficient light recycling.

Referring again to FIGS. 22A–C, the advantages of the invention can be realized in other configurations as well. In the embodiment illustrated in FIG. 22B, for example, the low-index film 720 can be electrically tuned so that it has desirable characteristics for inclusion in the electrical stack of the display material. In the embodiment illustrated in FIG. 22C, the patterned features of a color filter array, i.e., color filter resist materials 751, 752, 753 are included in the optical stack.

Optical stacks of the invention have other uses as well. For example, a low-index film 720 can be used as an enhancement film in the construction of LCD backlights. The films could be used to enhance the brightness of emissive displays, for example, OLED, plasma, field emission, CRT, micro, and other emissive displays.

Further, aerogels can be included in a display, for example, to provide an index of refraction that closely matches that of the ambient environment (e.g., air) and/or to utilize their exceptional thermal insulation properties to help ruggedize a display against thermal shock. Moreover, a gain reflector of a liquid crystal display could utilize principles of the invention to improve display brightness.

Although the invention has been described and illustrated above primarily as used with encapsulated electrophoretic media, a variety of other electro-optic media may be used in the displays of the present invention. The electro-optic medium could, for example, be a microcell electrophoretic display, in which the charged particles and the suspending fluid are not encapsulated within microcapsules but instead are retained within a plurality of cavities formed within a carrier medium, typically a polymeric film. See, for example, International Applications Publication No. WO 02/01281, and U.S. patent application Publication Ser. No. 2002/00,755,56, both assigned to Sipix Imaging, Inc.

The electro-optic medium could also be of the rotating bichromal member type as described, for example, in U.S. Pat. Nos. 5,808,783; 5,777,782; 5,760,761; 6,054,071 6,055, 091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical).

The electro-optic medium could also be an electrochromic medium, a preferred electrochromic medium being a nanochromic film comprising an electrode formed at least in part from a semi-conducing metal oxide and a plurality of dye molecules capable of reversible color change attached to the electrode; see, for example O'Regan, B., et al., Nature 1991, 353, 737. Nanochromic films of this type are also described, for example, in U.S. Pat. No. 6,301,038 and International Application Publication No. WO 01/27690; the entire contents of this patent and application are herein incorporated by reference. For example, electrochromic particles can provide a color changing reflective component of a display via oxidation/reduction reactions.

The following portion of the Detailed Description describes various embodiments of materials that may be included in an electrophoretic display medium of the electrophoretic displays of the present invention.

Useful materials for constructing an electrophoretic display medium, in particular for use in encapsulated electrophoretic displays, are discussed in further detail below. The discussion is organized into five topics: particles; suspending fluid; charge control agents and particle stabilizers; encapsulation; and binder material.

A. Particles

There is much flexibility in the choice of particles for use in electrophoretic displays, as described above. For purposes of this invention, a particle is any component that is charged or capable of acquiring a charge (i.e., has or is capable of acquiring electrophoretic mobility), and, in some cases, this mobility may be zero or close to zero (i.e., the particles will not move). The particles may be neat pigments, dyed (laked) pigments or pigment/polymer composites, or any other component that is charged or capable of acquiring a charge. Typical considerations for the electrophoretic particle are its optical properties, electrical properties, and surface chemistry. The particles may be organic or inorganic compounds, and they may either absorb light or scatter light. The particles for use in the invention may further include scattering pigments, absorbing pigments and luminescent particles. The particles may be retroreflective, such as corner cubes, or they may be electroluminescent, such as zinc sulfide particles, which emit light when excited by an AC field, or they may be photoluminescent. Finally, the particles may be surface treated so as to improve charging or interaction with a charging agent, or to improve dispersibility.

A preferred particle for use in electrophoretic displays of the invention is Titania. The titania particles may be coated with a metal oxide, such as aluminum oxide or silicon oxide, for example. The titania particles may have one, two, or more layers of metal-oxide coating. For example, a titania particle for use in electrophoretic displays of the invention may have a coating of aluminum oxide and a coating of silicon oxide. The coatings may be added to the particle in any order.

The electrophoretic particle is usually a pigment, a polymer, a laked pigment, or some combination of the above. A neat pigment can be any pigment, and, usually for a light colored particle, pigments such as, for example, rutile (titania), anatase (titania), barium sulfate, kaolin, or zinc oxide are useful. Some typical particles have high refractive indices, high scattering coefficients, and low absorption coefficients. Other particles are absorptive, such as carbon black or colored pigments used in paints and inks. The pigment should also be insoluble in the suspending fluid. Yellow pigments such as diarylide yellow, hansa yellow, and benzidin yellow have also found use in similar displays. Any other reflective material can be employed for a light colored particle, including non-pigment materials, such as metallic particles.

Useful neat pigments include, but are not limited to, $PbCrO_4$, Cyan blue GT 55-3295 (American Cyanamid Company, Wayne, N.J.), Cibacron Black BG (Ciba Company, Inc., Newport, Del.), Cibacron Turquoise Blue G (Ciba), Cibalon Black BGL (Ciba), Orasol Black BRG (Ciba), Orasol Black RBL (Ciba), Acetamine Blac, CBS (E. I. du Pont de Nemours and Company, Inc., Wilmington, Del.), Crocein Scarlet N Ex (du Pont) (27290), Fiber Black VF (DuPont) (30235), Luxol Fast Black L (DuPont) (Solv. Black 17), Nirosine Base No. 424 (DuPont) (50415 B), Oil Black BG (DuPont) (Solv. Black 16), Rotalin Black RM (DuPont), Sevron Brilliant Red 3 B (DuPont); Basic Black DSC (Dye Specialties, Inc.), Hectolene Black (Dye Specialties, Inc.), Azosol Brilliant Blue B (GAF, Dyestuff and Chemical Division, Wayne, N.J.) (Solv. Blue 9), Azosol Brilliant Green BA (GAF) (Solv. Green 2), Azosol Fast Brilliant Red B (GAF), Azosol Fast Orange RA Conc. (GAF) (Solv. Orange 20), Azosol Fast Yellow GRA Conc. (GAF) (13900 A), Basic Black KMPA (GAF), Benzofix Black CW-CF (GAF) (35435), Cellitazol BNFV Ex Soluble CF (GAF) (Disp. Black 9), Celliton Fast Blue AF Ex Conc (GAF) (Disp. Blue 9), Cyper Black IA (GAF) (Basic Blk. 3), Diamine Black CAP Ex Conc (GAF) (30235), Diamond Black EAN Hi Con. CF (GAF) (15710), Diamond Black PBBA Ex (GAF) (16505); Direct Deep Black EA Ex CF (GAF) (30235), Hansa Yellow G (GAF) (11680); Indanthrene Black BBK Powd. (GAF) (59850), Indocarbon CLGS Conc. CF (GAF) (53295), Katigen Deep Black NND Hi Conc. CF (GAF) (15711), Rapidogen Black 3 G (GAF) (Azoic Blk. 4); Sulphone Cyanine Black BA-CF (GAF) (26370), Zambezi Black VD Ex Conc. (GAF) (30015); Rubanox Red CP-1495 (The Sherwin-Williams Company, Cleveland, Ohio) (15630); Raven 11 (Columbian Carbon Company, Atlanta, Ga.), (carbon black aggregates with a particle size of about 25 $\mu$m), Statex B-12 (Columbian Carbon Co.) (a furnace black of 33 $\mu$m average particle size), and chrome green.

Particles may also include laked, or dyed, pigments. Laked pigments are particles that have a dye precipitated on them or which are stained. Lakes are metal salts of readily soluble anionic dyes. These are dyes of azo, triphenylmethane or anthraquinone structure containing one or more sulphonic or carboxylic acid groupings. They are usually precipitated by a calcium, barium or aluminum salt onto a substrate. Typical examples are peacock blue lake (CI Pigment Blue 24) and Persian orange (lake of CI Acid Orange 7), Black M Toner (GAF) (a mixture of carbon black and black dye precipitated on a lake).

A dark particle of the dyed type may be constructed from any light absorbing material, such as carbon black, or inorganic black materials. The dark material may also be selectively absorbing. For example, a dark green pigment may be used. Black particles may also be formed by staining latices with metal oxides, such latex copolymers consisting of any of butadiene, styrene, isoprene, methacrylic acid, methyl methacrylate, acrylonitrile, vinyl chloride, acrylic acid, sodium styrene sulfonate, vinyl acetate, chlorostyrene, dimethylaminopropylmethacrylamide, isocyanoethyl methacrylate and N-(isobutoxymethacrylamide), and optionally including conjugated diene compounds such as diacrylate, triacrylate, dimethylacrylate and trimethacrylate. Black particles may also be formed by a dispersion polymerization technique.

In the systems containing pigments and polymers, the pigments and polymers may form multiple domains within the electrophoretic particle, or be aggregates of smaller pigment/polymer combined particles. Alternatively, a central pigment core may be surrounded by a polymer shell. The pigment, polymer, or both can contain a dye. The optical purpose of the particle may be to scatter light, absorb light, or both. Useful sizes may range from 1 nm up to about 100 $\mu$m, as long as the particles are smaller than the bounding capsule. In a preferred embodiment, the density of the electrophoretic particle may be substantially matched to that of the suspending (i.e., electrophoretic) fluid. As defined herein, a suspending fluid has a density that is "substantially matched" to the density of the particle if the difference in their respective densities is between about zero and about two g/ml. This difference is preferably between about zero and about 0.5 g/ml. Useful polymers for the particles include, but are not limited to: polystyrene, polyethylene, polypropylene, phenolic resins, Du Pont Elvax resins (ethylene-vinyl acetate copolymers), polyesters, polyacrylates, polymethacrylates, ethylene acrylic acid or methacrylic acid copolymers (Nucrel Resins—DuPont, Primacor Resins—Dow Chemical), acrylic copolymers and terpolymers (Elvacite Resins, DuPont) and PMMA. Useful materials for homopolymer/pigment phase separation in high shear melt include, but are not limited to, polyethylene, polypropylene, polymethylmethacrylate, polyisobutylmethacrylate, polystyrene, polybutadiene, polyisoprene, polyisobutylene, polylauryl methacrylate, polystearyl methacrylate, polyisobornyl methacrylate, poly-t-butyl methacrylate, polyethyl methacrylate, polymethyl acrylate, polyethyl acrylate, polyacrylonitrile, and copolymers of two or more of these materials. Some useful pigment/polymer complexes that are commercially available include, but are not limited to, Process Magenta PM 1776 (Magruder Color Company, Inc., Elizabeth, N.J.), Methyl Violet PMA VM6223 (Magruder Color Company, Inc., Elizabeth, N.J.), and Naphthol FGR RF6257 (Magruder Color Company, Inc., Elizabeth, N.J.).

The pigment-polymer composite may be formed by a physical process, (e.g., attrition or ball milling), a chemical process (e.g., microencapsulation or dispersion polymerization), or any other process known in the art of particle production. From the following non-limiting examples, it may be seen that the processes and materials for both the fabrication of particles and the charging thereof are generally derived from the art of liquid toner, or liquid immersion development. Thus any of the known processes from liquid development are particularly, but not exclusively, relevant.

New and useful electrophoretic particles may still be discovered, but a number of particles already known to those skilled in the art of electrophoretic displays and liquid toners can also prove useful. In general, the polymer requirements for liquid toners and encapsulated electrophoretic inks are similar, in that the pigment or dye must be easily incorporated therein, either by a physical, chemical, or physicochemical process, may aid in the colloidal stability, and may contain charging sites or may be able to incorporate materials which contain charging sites. One general requirement from the liquid toner industry that is not shared by encapsulated electrophoretic inks is that the toner must be capable of "fixing" the image, i.e., heat fusing together to create a uniform film after the deposition of the toner particles.

Typical manufacturing techniques for particles are drawn from the liquid toner and other arts and include ball milling, attrition, jet milling, etc. The process will be illustrated for the case of a pigmented polymeric particle. In such a case the pigment is compounded in the polymer, usually in some kind of high shear mechanism such as a screw extruder. The composite material is then (wet or dry) ground to a starting size of around 10 $\mu$m. It is then dispersed in a carrier liquid, for example ISOPAR® (Exxon, Houston, Tex.), optionally with some charge control agent(s), and milled under high shear for several hours down to a final particle size and/or size distribution.

Another manufacturing technique for particles drawn from the liquid toner field is to add the polymer, pigment, and suspending fluid to a media mill. The mill is started and simultaneously heated to temperature at which the polymer swells substantially with the solvent. This temperature is typically near 100° C. In this state, the pigment is easily encapsulated into the swollen polymer. After a suitable time, typically a few hours, the mill is gradually cooled back to ambient temperature while stirring. The milling may be continued for some time to achieve a small enough particle size, typically a few micrometers in diameter. The charging agents may be added at this time. Optionally, more suspending fluid may be added.

Chemical processes such as dispersion polymerization, mini- or micro-emulsion polymerization, suspension polymerization precipitation, phase separation, solvent evaporation, in situ polymerization, seeded emulsion polymerization, or any process which falls under the general category of microencapsulation may be used. A typical process of this type is a phase separation process wherein a dissolved polymeric material is precipitated out of solution onto a dispersed pigment surface through solvent dilution, evaporation, or a thermal change. Other processes include chemical means for staining polymeric lattices, for example with metal oxides or dyes.

B. Suspending Fluid

The suspending fluid containing the particles can be chosen based on properties such as density, refractive index, and solubility. A preferred suspending fluid has a low dielectric constant (about 2), high volume resistivity (about $10^{15}$ ohm-cm), low viscosity (less than 5 cst), low toxicity and environmental impact, low water solubility (less than 10 ppm), high specific gravity (greater than 1.5), a high boiling point (greater than 90° C.), and a low refractive index (less than 1.2).

The choice of suspending fluid may be based on concerns of chemical inertness, density matching to the electrophoretic particle, or chemical compatibility with both the electrophoretic particle and bounding capsule. The viscosity of the fluid should be low when you want the particles to move. The refractive index of the suspending fluid may also be substantially matched to that of the particles. As used herein, the refractive index of a suspending fluid "is substantially matched" to that of a particle if the difference between their respective refractive indices is between about zero and about 0.3, and is preferably between about 0.05 and about 0.2.

Additionally, the fluid may be chosen to be a poor solvent for some polymers, which is advantageous for use in the fabrication of microparticles because it increases the range of polymeric materials useful in fabricating particles of polymers and pigments. Organic solvents, such as halogenated organic solvents, saturated linear or branched hydrocarbons, silicone oils, and low molecular weight halogen-containing polymers are some useful suspending fluids. The suspending fluid may comprise a single fluid. The fluid will, however, often be a blend of more than one fluid in order to tune its chemical and physical properties. Furthermore, the fluid may contain surface modifiers to modify the surface energy or charge of the electrophoretic particle or bounding capsule. Reactants or solvents for the microencapsulation process (oil soluble monomers, for example) can also be contained in the suspending fluid. Charge control agents can also be added to the suspending fluid.

Useful organic solvents include, but are not limited to, epoxides, such as, for example, decane epoxide and dodecane epoxide; vinyl ethers, such as, for example, cyclohexyl vinyl ether and Decave® (International Flavors & Fragrances, Inc., New York, N.Y.); and aromatic hydrocarbons, such as, for example, toluene and naphthalene. Useful halogenated organic solvents include, but are not limited to, tetrafluorodibromoethylene, tetrachloroethylene, trifluorochloroethylene, 1,2,4-trichlorobenzene, carbon tetrachloride. These materials have high densities. Useful hydrocarbons include, but are not limited to, dodecane, tetradecane, the aliphatic hydrocarbons in the Isopar® series (Exxon, Houston, Tex.), Norpar® (series of normal paraffinic liquids), Shell-Sol® (Shell, Houston, Tex.), and Sol-Trol® (Shell), naphtha, and other petroleum solvents. These materials usually have low densities. Useful examples of silicone oils include, but are not limited to, octamethyl cyclosiloxane and higher molecular weight cyclic siloxanes, poly (methyl phenyl siloxane), hexamethyldisiloxane, and polydimethylsiloxane. These materials usually have low densities. Useful low molecular weight halogen-containing polymers include, but are not limited to, poly(chlorotrifluoroethylene) polymer (Halogenated hydrocarbon Inc., River Edge, N.J.), Galden® (a perfluorinated ether from Ausimont, Morristown, N.J.), or Krytox® from DuPont (Wilmington, Del.). In a preferred embodiment, the suspending fluid is a poly (chlorotrifluoroethylene) polymer. In a particularly preferred embodiment, this polymer has a degree of polymerization from about 2 to about 10. Many of the above materials are available in a range of viscosities, densities, and boiling points.

The fluid must be capable of being formed into small droplets prior to a capsule being formed. Processes for forming small droplets include flow-through jets, membranes, nozzles, or orifices, as well as shear-based emulsifying schemes. The formation of small drops may be assisted by electrical or sonic fields. Surfactants and polymers can be used to aid in the stabilization and emulsification of the droplets in the case of an emulsion type encapsulation. A preferred surfactant for use in displays of the invention is sodium dodecylsulfate.

It can be advantageous in some displays for the suspending fluid to contain an optically absorbing dye. This dye must be soluble in the fluid, but will generally be insoluble in the other components of the capsule. There is much flexibility in the choice of dye material. The dye can be a pure compound, or blends of dyes to achieve a particular color, including black. The dyes can be fluorescent, which would produce a display in which the fluorescence properties depend on the position of the particles. The dyes can be photoactive, changing to another color or becoming colorless upon irradiation with either visible or ultraviolet light, providing another means for obtaining an optical response. Dyes could also be polymerizable, forming a solid absorbing polymer inside the bounding shell.

There are many dyes that can be chosen for use in encapsulated electrophoretic display. Properties important here include light fastness, solubility in the suspending liquid, color, and cost. These are generally from the class of azo, anthraquinone, and triphenylmethane type dyes and may be chemically modified so as to increase the solubility in the oil phase and reduce the adsorption by the particle surface.

A number of dyes already known to those skilled in the art of electrophoretic displays will prove useful. Useful azo dyes include, but are not limited to: the Oil Red dyes, and the Sudan Red and Sudan Black series of dyes. Useful anthraquinone dyes include, but are not limited to: the Oil Blue dyes, and the Macrolex Blue series of dyes. Useful triphenylmethane dyes include, but are not limited to, Michler's hydrol, Malachite Green, Crystal Violet, and Auramine O.

C. Charge Control Agents and Particle Stabilizers

Charge control agents are used to provide good electrophoretic mobility to the electrophoretic particles. Stabilizers are used to prevent agglomeration of the electrophoretic particles, as well as prevent the electrophoretic particles from irreversibly depositing onto the capsule wall. Either component can be constructed from materials across a wide range of molecular weights (low molecular weight, oligomeric, or polymeric), and may be pure or a mixture. In particular, suitable charge control agents are generally adapted from the liquid toner art. The charge control agent used to modify and/or stabilize the particle surface charge is applied as generally known in the arts of liquid toners, electrophoretic displays, non-aqueous paint dispersions, and engine-oil additives. In all of these arts, charging species may be added to non-aqueous media in order to increase electrophoretic mobility or increase electrostatic stabilization. The materials can improve steric stabilization as well. Different theories of charging are postulated, including selective ion adsorption, proton transfer, and contact electrification.

An optional charge control agent or charge director may be used. These constituents typically consist of low molecular weight surfactants, polymeric agents, or blends of one or more components and serve to stabilize or otherwise modify the sign and/or magnitude of the charge on the electrophoretic particles. The charging properties of the pigment itself may be accounted for by taking into account the acidic or basic surface properties of the pigment, or the charging sites may take place on the carrier resin surface (if present), or a combination of the two. Additional pigment properties which may be relevant are the particle size distribution, the chemical composition, and the lightfastness. The charge control agent used to modify and/or stabilize the particle surface charge is applied as generally known in the arts of liquid toners, electrophoretic displays, non-aqueous paint dispersions, and engine-oil additives. In all of these arts, charging species may be added to non-aqueous media in order to increase electrophoretic mobility or increase electrostatic stabilization. The materials can improve steric stabilization as well. Different theories of charging are postulated, including selective ion adsorption, proton transfer, and contact electrification.

Charge adjuvants may also be added. These materials increase the effectiveness of the charge control agents or charge directors. The charge adjuvant may be a polyhydroxy compound or an aminoalcohol compound, which are preferably soluble in the suspending fluid in an amount of at least 2% by weight. Examples of polyhydroxy compounds which contain at least two hydroxyl groups include, but are not limited to, ethylene glycol, 2,4,7,9-tetramethyl-decyne-4,7-diol, poly(propylene glycol), pentaethylene glycol, tripropylene glycol, triethylene glycol, glycerol, pentaerythritol, glycerol tris(12-hydroxystearate), propylene glycol monohydroxystearate, and ethylene glycol monohydroxystrearate. Examples of aminoalcohol compounds which contain at least one alcohol function and one amine function in the same molecule include, but are not limited to, triisopropanolamine, triethanolamine, ethanolamine, 3-amino-1-propanol, o-aminophenol, 5-amino-1-pentanol, and tetrakis(2-hydroxyethyl)ethylene-diamine. The charge adjuvant is preferably present in the suspending fluid in an amount of about 1 to about 100 mg/g of the particle mass, and more preferably about 50 to about 200 mg/g.

The surface of the particle may also be chemically modified to aid dispersion, to improve surface charge, and to improve the stability of the dispersion, for example. Surface modifiers include organic siloxanes, organohalogen silanes and other functional silane coupling agents (Dow Corning® Z-6070, Z-6124, and 3 additive, Midland, Mich.); organic titanates and zirconates (Tyzor® TOT, TBT, and TE Series, DuPont, Wilmington, Del.); hydrophobing agents, such as long chain (C12 to C50) alkyl and alkyl benzene sulphonic acids, fatty amines or diamines and their salts or quaternary derivatives; and amphipathic polymers which can be covalently bonded to the particle surface.

In general, it is believed that charging results as an acid-base reaction between some moiety present in the continuous phase and the particle surface. Thus useful materials are those which are capable of participating in such a reaction, or any other charging reaction as known in the art.

Different non-limiting classes of charge control agents which are useful include organic sulfates or sulfonates, metal soaps, block or comb copolymers, organic amides, organic zwitterions, and organic phosphates and phosphonates. Useful organic sulfates and sulfonates include, but are not limited to, sodium bis(2-ethyl hexyl)sulfosuccinate, calcium dodecyl benzene sulfonate, calcium petroleum sulfonate, neutral or basic barium dinonylnaphthalene sulfonate, neutral or basic calcium dinonylnaphthalene sulfonate, dodecylbenzenesulfonic acid sodium salt, and ammonium lauryl sulphate. Useful metal soaps include, but are not limited to, basic or neutral barium petronate, calcium petronate, Co—, Ca—, Cu—, Mn—, Ni—, Zn—, and Fe— salts of naphthenic acid, Ba—, Al—, Zn—, Cu—, Pb—, and Fe— salts of stearic acid, divalent and trivalent metal carboxylates, such as aluminum tristearate, aluminum octoanate, lithium heptanoate, iron stearate, iron distearate, barium stearate, chromium stearate, magnesium octanoate, calcium stearate, iron naphthenate, and zinc naphthenate, Mn— and Zn— heptanoate, and Ba—, Al—, Co—, Mn—, and Zn— octanoate. Useful block or comb copolymers include, but are not limited to, AB diblock copolymers of (A) polymers of 2-(N,N)-dimethylaminoethyl methacrylate quaternized with methyl-p-toluenesulfonate and (B) poly-2-ethylhexyl methacrylate, and comb graft copolymers with oil soluble tails of poly (12-hydroxystearic acid) and having a molecular weight of about 1800, pendant on an oil-soluble anchor group of poly(methyl methacrylate-methacrylic acid). Useful organic amides include, but are not limited to, polyisobutylene succinimides such as OLOA 1200 and 3700, and N-vinyl pyrrolidone polymers. Useful organic zwitterions include, but are not limited to, lecithin. Useful organic phosphates and phosphonates include, but are not limited to, the sodium salts of phosphated mono- and di-glycerides with saturated and unsaturated acid substituents.

Particle dispersion stabilizers may be added to prevent particle flocculation or attachment to the capsule walls. For the typical high resistivity liquids used as suspending fluids in electrophoretic displays, nonaqueous surfactants may be used. These include, but are not limited to, glycol ethers, acetylenic glycols, alkanolamides, sorbitol derivatives, alkyl amines, quaternary amines, imidazolines, dialkyl oxides, and sulfosuccinates.

D. Encapsulation

An encapsulated electrophoretic display may take many forms. Encapsulation of the internal phase (e.g., electrophoretic particles and suspending fluid) may be accomplished in a number of different ways. The display may comprise capsules dispersed in a binder. The capsules may be of any size or shape. The capsules may, for example, be spherical and may have diameters in the millimeter range or the micrometer range, but is preferably from ten to a few hundred micrometers. The capsules may be formed by an encapsulation technique, as described below. Particles may be encapsulated in the capsules. The particles may be two or more different types of particles. The particles may be colored, luminescent, light-absorbing or transparent, for example. The particles may include neat pigments, dyed (laked) pigments or pigment/polymer composites, for example. The display may further comprise a suspending fluid in which the particles are dispersed.

The successful construction of an encapsulated electrophoretic display requires the proper interaction of several different types of materials and processes, such as a polymeric binder and, optionally, a capsule membrane. These materials must be chemically compatible with the electrophoretic particles and fluid, as well as with each other. The capsule materials may engage in useful surface interactions with the electrophoretic particles, or may act as a chemical or physical boundary between the fluid and the binder.

In some embodiments, the encapsulation of the or internal phase may be performed by directly dispersing or emulsifying the internal phase into the binder (or a precursor to the binder materials) and an effective "polymer-dispersed electrophoretic display" constructed. In such displays, voids created in the binder may be referred to as capsules or microcapsules even though no capsule membrane is present. The binder dispersed electrophoretic display may be of the emulsion or phase separation type.

The internal phase can be encapsulated in a cell structure. Some examples of cell structures are disclosed in U.S. Pat. No. to 6,327,072 to Comiskey et al. A cell structure can include a single sheet or film of polymeric material. The cell structure can be manufactured via any of a variety of techniques, which include deposition, lithography, and embossing. Individual cells can have any of a variety of two-dimensional shapes polygonal (as viewed along a normal to a plane of the cell structure), which include round, square and. Individual cells can have flat and or curved surfaces. For example, a cell wall can define a polygonal solid or a hemispherical solid.

Numerous suitable procedures for microencapsulation are detailed in both *Microencapsulation, Processes and Applications*, (I. E. Vandegaer, ed.), Plenum Press, New York, N.Y. (1974) and Gutcho, *Microcapsules and Mircroencapsulation Techniques*, Nuyes Data Corp., Park Ridge, N.J. (1976). The processes fall into several general categories, all of which can be applied to the present invention: interfacial polymerization, in situ polymerization, physical processes, such as coextrusion and other phase separation processes, in-liquid curing, and simple/complex coacervation.

Numerous materials and processes should prove useful in formulating displays of the present invention. Useful materials for simple coacervation processes include, but are not limited to, gelatin, polyvinyl alcohol, polyvinyl acetate, and cellulosic derivatives, such as, for example, carboxymethylcellulose. Useful materials for complex coacervation processes include, but are not limited to, gelatin, acacia, carageenan, carboxymethylcellulose, hydrolyzed styrene anhydride copolymers, agar, alginate, casein, albumin, methyl vinyl ether co-maleic anhydride, and cellulose phthalate. Useful materials for phase separation processes include, but are not limited to, polystyrene, PMMA, polyethyl methacrylate, polybutyl methacrylate, ethyl cellulose, polyvinyl pyridine, and poly acrylonitrile. Useful materials for in situ polymerization processes include, but are not limited to, polyhydroxyamides, with aldehydes, melamine, or urea and formaldehyde; water-soluble oligomers of the condensate of melamine, or urea and formaldehyde; and vinyl monomers, such as, for example, styrene, MMA and acrylonitrile. Finally, useful materials for interfacial polymerization processes include, but are not limited to, diacyl chlorides, such as, for example, sebacoyl, adipoyl, and di- or poly-amines or alcohols, and isocyanates. Useful emulsion polymerization materials may include, but are not limited to, styrene, vinyl acetate, acrylic acid, butyl acrylate, t-butyl acrylate, methyl methacrylate, and butyl methacrylate.

Capsules produced may be dispersed into a curable carrier, resulting in an ink which may be printed or coated on large and arbitrarily shaped or curved surfaces using conventional printing and coating techniques.

In the context of the present invention, one skilled in the art will select an encapsulation procedure and wall material based on the desired capsule properties. These properties include the distribution of capsule radii; electrical, mechanical, diffusion, and optical properties of the capsule wall; and chemical compatibility with the internal phase of the capsule.

The capsule wall generally has a high electrical resistivity. Although it is possible to use walls with relatively low resistivities, this may limit performance in requiring relatively higher addressing voltages. The capsule wall should also be mechanically strong (although if the finished capsule powder is to be dispersed in a curable polymeric binder for coating, mechanical strength is not as critical). The capsule wall should generally not be porous. If, however, it is desired to use an encapsulation procedure that produces porous capsules, these can be overcoated in a post-processing step (i.e., a second encapsulation). Moreover, if the capsules are to be dispersed in a curable binder, the binder will serve to close the pores. The capsule walls should be optically clear. The wall material may, however, be chosen to match the refractive index of the internal phase of the capsule (i.e., the suspending fluid) or a binder in which the capsules are to be dispersed. For some applications (e.g., interposition between two fixed electrodes), monodispersed capsule radii are desirable.

An encapsulation procedure involves a polymerization between urea and formaldehyde in an aqueous phase of an oil/water emulsion in the presence of a negatively charged, carboxyl-substituted, linear hydrocarbon polyelectrolyte material. The resulting capsule wall is a urea/formaldehyde copolymer, which discretely encloses the internal phase. The capsule is clear, mechanically strong, and has good resistivity properties.

The related technique of in situ polymerization utilizes an oil/water emulsion, which is formed by dispersing the electrophoretic composition (i.e., the dielectric liquid containing a suspension of the pigment particles) in an aqueous environment. The monomers polymerize to form a polymer with higher affinity for the internal phase than for the aqueous phase, thus condensing around the emulsified oily droplets. In one especially useful in situ polymerization processes, urea and formaldehyde condense in the presence of poly (acrylic acid) (See, e.g., U.S. Pat. No. 4,001,140). In other useful process, any of a variety of cross-linking agents borne in aqueous solution is deposited around microscopic oil droplets. Such cross-linking agents include aldehydes, especially formaldehyde, glyoxal, or glutaraldehyde; alum; zirconium salts; and poly isocyanates. The entire disclosures of the U.S. Pat. Nos. 4,001,140 and 4,273,672 are hereby incorporated by reference herein.

The coacervation approach also utilizes an oil/water emulsion. One or more colloids are coacervated (i.e., agglomerated) out of the aqueous phase and deposited as shells around the oily droplets through control of temperature, pH and/or relative concentrations, thereby creating the microcapsule. Materials suitable for coacervation include gelatins and gum arabic.

The interfacial polymerization approach relies on the presence of an oil-soluble monomer in the electrophoretic composition, which once again is present as an emulsion in an aqueous phase. The monomers in the minute hydrophobic droplets react with a monomer introduced into the aqueous phase, polymerizing at the interface between the droplets and the surrounding aqueous medium and forming shells around the droplets. Although the resulting walls are relatively thin and may be permeable, this process does not require the elevated temperatures characteristic of some other processes, and therefore affords greater flexibility in terms of choosing the dielectric liquid.

Coating aids can be used to improve the uniformity and quality of the coated or printed electrophoretic ink material. Wetting agents are typically added to adjust the interfacial tension at the coating/substrate interface and to adjust the liquid/air surface tension. Wetting agents include, but are not limited to, anionic and cationic surfactants, and nonionic species, such as silicone or fluoropolymer based materials. Dispersing agents may be used to modify the interfacial tension between the capsules and binder, providing control over flocculation and particle settling.

Surface tension modifiers can be added to adjust the air/ink interfacial tension. Polysiloxanes are typically used in such an application to improve surface leveling while minimizing other defects within the coating. Surface tension modifiers include, but are not limited to, fluorinated surfactants, such as, for example, the Zonyl® series from DuPont (Wilmington, Del.), the Fluorod® series from 3M (St. Paul, Minn.), and the fluoroakyl series from Autochem (Glen Rock, N.J.); siloxanes, such as, for example, Silwet® from Union Carbide (Danbury, Conn.); and polyethoxy and polypropoxy alcohols. Antifoams, such as silicone and silicone-free polymeric materials, may be added to enhance the movement of air from within the ink to the surface and to facilitate the rupture of bubbles at the coating surface. Other useful antifoams include, but are not limited to, glyceryl esters, polyhydric alcohols, compounded antifoams, such as oil solutions of alkyl benzenes, natural fats, fatty acids, and metallic soaps, and silicone antifoaming agents made from the combination of dimethyl siloxane polymers and silica. Stabilizers such as uv-absorbers and antioxidants may also be added to improve the lifetime of the ink.

Other additives to control properties like coating viscosity and foaming can also be used in the coating fluid. Stabilizers (UV-absorbers, antioxidants) and other additives which could prove useful in practical materials.

E. Binder Material

The binder is used as a non-conducting, adhesive medium supporting and protecting the capsules, as well as binding the electrode materials to the capsule dispersion. Binders are available in many forms and chemical types. Among these are water-soluble polymers, water-borne polymers, oil-soluble polymers, thermoset and thermoplastic polymers, and radiation-cured polymers.

Among the water-soluble polymers are the various polysaccharides, the polyvinyl alcohols, N-methylpyrrolidone, N-vinylpyrrollidone, the various Carbowax® species (Union Carbide, Danbury, Conn.), and poly-2-hydroxyethylacrylate.

The water-dispersed or water-borne systems are generally latex compositions, typified by the Neorez® and Neocryl® resins (Zeneca Resins, Wilmington, Mass.), Acrysol® (Rohm and Haas, Philadelphia, Pa.), Bayhydrol® (Bayer, Pittsburgh, Pa.), and the Cytec Industries (West Paterson, N.J.) HP line. These are generally latices of polyurethanes, occasionally compounded with one or more of the acrylics, polyesters, polycarbonates or silicones, each lending the final cured resin in a specific set of properties defined by glass transition temperature, degree of "tack," softness, clarity, flexibility, water permeability and solvent resistance, elongation modulus and tensile strength, thermoplastic flow, and solids level. Some water-borne systems can be mixed with reactive monomers and catalyzed to form more complex resins. Some can be further cross-linked by the use of a crosslinking reagent, such as an aziridine, for example, which reacts with carboxyl groups.

A typical application of a water-borne resin and aqueous capsules follows. A volume of particles is centrifuged at low speed to separate excess water. After a given centrifugation process, for example 10 minutes at 60×G, the capsules are found at the bottom of the centrifuge tube, while the water portion is at the top. The water portion is carefully removed (by decanting or pipetting). The mass of the remaining capsules is measured, and a mass of resin is added such that the mass of resin is between one eighth and one tenth of the weight of the capsules. This mixture is gently mixed on an oscillating mixer for approximately one half hour. After about one half hour, the mixture is ready to be coated onto the appropriate substrate.

The thermoset systems are exemplified by the family of epoxies. These binary systems can vary greatly in viscosity, and the reactivity of the pair determines the "pot life" of the mixture. If the pot life is long enough to allow a coating operation, capsules may be coated in an ordered arrangement in a coating process prior to the resin curing and hardening.

Thermoplastic polymers, which are often polyesters, are molten at high temperatures. A typical application of this type of product is hot-melt glue. A dispersion of heat-resistant capsules could be coated in such a medium. The solidification process begins during cooling, and the final hardness, clarity and flexibility are affected by the branching and molecular weight of the polymer.

Oil or solvent-soluble polymers are often similar in composition to the water-borne system, with the obvious exception of the water itself. The latitude in formulation for solvent systems is enormous, limited only by solvent choices and polymer solubility. Of considerable concern in solvent-based systems is the viability of the capsule itself—the integrity of the capsule wall cannot be compromised in any way by the solvent.

Radiation cure resins are generally found among the solvent-based systems. Capsules may be dispersed in such a medium and coated, and the resin may then be cured by a timed exposure to a threshold level of very violet radiation, either long or short wavelength. As in all cases of curing polymer resins, final properties are determined by the branching and molecular weights of the monomers, oligomers and crosslinkers.

A number of "water-reducible" monomers and oligomers are, however, marketed. In the strictest sense, they are not water soluble, but water is an acceptable diluent at low concentrations and can be dispersed relatively easily in the mixture. Under these circumstances, water is used to reduce the viscosity (initially from thousands to hundreds of thousands centipoise). Water-based capsules, such as those made from a protein or polysaccharide material, for example, could be dispersed in such a medium and coated, provided the viscosity could be sufficiently lowered. Curing in such systems is generally by ultraviolet radiation.

While the invention has been particularly shown and described with reference to specific preferred embodiments, it should be understood by those skilled in the art that various changes in form and detail may be made therein without departing from the spirit and scope of the invention as defined by the appended claims. For example, a display element may include more than one optical biasing element, for example, an element embedded in a binder as well as a layer of material added beneath the display medium.

What is claimed is:

1. A display device comprising:
    a window layer having a refractive index that is greater than a refractive index of an ambient environment;
    a plurality of reflective particles suspended in a fluid, the plurality of reflective particles for scattering light received from the ambient environment;
    a material portion disposed between the plurality of reflective particles and the window layer; and
    a refractive layer disposed between the material portion and the window layer, and having a refractive index that is less than the refractive index of the window layer and less than a refractive index of the material portion.

2. The display device of claim 1, further comprising at least one film layer disposed between and in contact with the material portion and the refractive layer.

3. The display device of claim 2, wherein a portion of the plurality of reflective particles belongs to a pixel of the display device, and the material portion and the at least one film layer have a combined thickness such that more than half of light scattered by the portion of the plurality of reflective particles and internally reflected returns to the same pixel.

4. The display device of claim 3, wherein the combined thickness is less than 10 micrometers.

5. The display device of claim 3, wherein the combined thickness is less than 3 micrometers.

6. The display device of claim 2, wherein the at least one film layer comprises an electrically conductive layer.

7. The display device of claim 2, wherein each of the at least one film layer has a thickness in a range of 0.05 to 0.30 micrometer.

8. The display device of claim 1, wherein the plurality of reflective particles provide a Lambertian distribution of scattered light.

9. The display device of claim 1, further comprising an encapsulating structure that encapsulates the plurality of reflective particles, wherein the material portion is a portion of the encapsulating structure.

10. The display device of claim 9, wherein the encapsulating structure comprises at least one structure selected from the group consisting of a cell structure, a capsule membrane, and a binder.

11. The display device of claim 1, wherein the material portion comprises a layer defining a wall that contains the plurality of reflective particles.

12. The display device of claim 1, wherein the refractive index of the refractive layer is closer to the refractive index of the ambient environment than to the refractive index of the material portion.

13. The display device of claim 1, wherein the refractive index of the material portion is greater than 1.4.

14. The display device of claim 1, wherein the refractive layer comprises either a vacuum or a gas-filled gap.

15. The display device of claim 1, wherein the refractive layer comprises a porous material.

16. The display device of claim 1, wherein the ambient environment comprises air, and the refractive index of the refractive layer is in a range of 1.0 to 1.2.

17. The display device of claim 1, wherein the refractive layer comprises a composite material.

18. The display device of claim 1, wherein the refractive layer has a thickness greater than the longest wavelength of visible light incident upon the display.

19. The display device of claim 18, wherein the refractive layer has a thickness greater than 1 micrometer.

20. The display device of claim 1, wherein the refractive index of the refractive layer is less than 1.3.

21. The display device of claim 1 wherein at least one of the plurality of particles is an electrophoretic particle.

22. The display device of claim 1 wherein at least one of the plurality of particles is a rotating bichromal member.

23. A display device comprising:
   a window layer having a refractive index that is greater than a refractive index of an ambient environment;
   a plurality of reflective particles for scattering light received from the ambient environment, wherein at least one of the plurality of reflective particles is selected from the group consisting of an electrophoretic particle, a rotating bichromal member, and an electrochromic particle;
   a material portion disposed between the plurality of reflective particles and the window layer; and
   a refractive layer disposed between the material portion and the window layer, and having a refractive index that is less than the refractive index of the window layer and less than a refractive index of the material portion.

24. The display device of claim 23 wherein at least one of the plurality of particles is an electrophoretic particle.

25. The display device of claim 23 wherein at least one of the plurality of particles is a rotating bichromal member.

26. The display device of claim 23 wherein at least one of the plurality of particles is an electrochromic particle.

27. A method for making a display device, the method comprising:
   providing a window layer having a refractive index that is greater than a refractive index of an ambient environment;
   providing a plurality of reflective particles suspended in a fluid, the plurality of reflective particles for scattering light received from the ambient environment;
   providing a material portion disposed between the plurality of reflective particles and the window layer; and
   providing a refractive layer disposed between the material portion and the window layer, and having a refractive index that is less than the refractive index of the window layer and less than a refractive index of the material portion.

28. The method of claim 27, further comprising selecting a thickness of the material portion to cause most internally reflected scattered light to return to a same pixel.

29. The display device of claim 27 wherein at least one of the plurality of particles is an electrophoretic particle.

30. The display device of claim 27 wherein at least one of the plurality of particles is a rotating bichromal member.

31. A display device comprising:
   a window layer having a refractive index that is greater than a refractive index of an ambient environment, wherein the ambient environment comprises air;
   a plurality of reflective particles for scattering light received from the ambient environment;
   a material portion disposed between the plurality of reflective particles and the window layer; and
   a refractive layer disposed between the material portion and the window layer and having a refractive index in a range of 1.0 to 1.2.

32. A display device comprising:
   a window layer having a refractive index that is greater than a refractive index of an ambient environment;
   a plurality of reflective particles for scattering light received from the ambient environment;
   a material portion disposed between the plurality of reflective particles and the window layer; and
   a refractive layer disposed between the material portion and the window layer, the refractive layer has a thickness greater than the longest wavelength of visible light incident upon the display, and the refractive layer has a refractive index that is less than the refractive index of the window layer and less than a refractive index of the material portion.

* * * * *